United States Patent
Akasaka

(10) Patent No.: US 9,678,381 B2
(45) Date of Patent: Jun. 13, 2017

(54) ELECTRO-OPTICAL DEVICE AND ELECTRONIC APPARATUS

(71) Applicant: Seiko Epson Corporation, Tokyo (JP)

(72) Inventor: Koichiro Akasaka, Ina (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 14/450,744

(22) Filed: Aug. 4, 2014

(65) Prior Publication Data

US 2015/0042926 A1 Feb. 12, 2015

(30) Foreign Application Priority Data

Aug. 7, 2013 (JP) ................................ 2013-163944

(51) Int. Cl.
   *G02F 1/1335* (2006.01)
(52) U.S. Cl.
   CPC .. *G02F 1/133526* (2013.01); *G02F 1/133512* (2013.01); *G02F 2001/133565* (2013.01)
(58) Field of Classification Search
   None
   See application file for complete search history.

(56) References Cited

U.S. PATENT DOCUMENTS

| 5,177,637 A * | 1/1993 | Tsukada | G03B 13/24 |
| | | | 359/599 |
| 6,724,450 B1 | 4/2004 | Knoll et al. | |
| 2002/0126390 A1* | 9/2002 | Matsushita | G02B 3/0068 |
| | | | 359/621 |
| 2005/0105188 A1 | 5/2005 | Hayashi et al. | |
| 2005/0128595 A1* | 6/2005 | Shimizu | G02B 3/0056 |
| | | | 349/98 |
| 2005/0185118 A1 | 8/2005 | Murade | |
| 2007/0109248 A1 | 5/2007 | Iisaka | |
| 2009/0040400 A1 | 2/2009 | Nakagawa et al. | |
| 2010/0157424 A1 | 6/2010 | Katsuma et al. | |
| 2011/0234942 A1 | 9/2011 | Nakagome et al. | |
| 2014/0152908 A1* | 6/2014 | Nimura | G02F 1/133526 |
| | | | 349/8 |

FOREIGN PATENT DOCUMENTS

| JP | 63-221329 A | | 9/1988 | |
| JP | 02-115889 | * | 4/1990 | ............... G09F 9/00 |
| JP | 02115889 A | * | 4/1990 | |

(Continued)

*Primary Examiner* — Edward Glick
*Assistant Examiner* — Anthony G Quash
(74) *Attorney, Agent, or Firm* — ALG Intellectual Property, LLC

(57) ABSTRACT

A liquid crystal device includes first pixels and second pixels which are adjacent to one another and are partitioned by light shielding portions. The liquid crystal device also includes an element substrate, an opposing substrate which is disposed to oppose the element substrate, a liquid crystal layer which is disposed between the element substrate and the opposing substrate, first micro lenses which correspond to the first pixels which are disposed on the opposing substrate, and second micro lenses which correspond to the second pixels and have different lens diameters from the first micro lenses. A boundary between the first micro lenses and the second micro lenses is disposed in a region which overlaps the light shielding portions in plan view.

12 Claims, 17 Drawing Sheets

(56) References Cited

FOREIGN PATENT DOCUMENTS

| | | | |
|---|---|---|---|
| JP | 02-264224 | A | 10/1990 |
| JP | 04-119339 | A | 4/1992 |
| JP | 09-160075 | A | 6/1997 |
| JP | 2001-021892 | A | 1/2001 |
| JP | 2005-148427 | A | 6/2005 |
| JP | 2005-352392 | A | 12/2005 |
| JP | 2007-017686 | A | 1/2007 |
| JP | 2007-139925 | A | 6/2007 |
| JP | 2008-545149 | A | 12/2008 |
| JP | 2009-122685 | A | 6/2009 |
| JP | 2009-217218 | A | 9/2009 |
| JP | 2009-294249 | A | 12/2009 |
| JP | 2010-151902 | A | 7/2010 |
| JP | 2010-204156 | A | 9/2010 |
| JP | 2011-090299 | A | 5/2011 |
| JP | 2011-102848 | A | 5/2011 |
| JP | 2011-158914 | A | 8/2011 |
| JP | 2012-098409 | A | 5/2012 |

\* cited by examiner

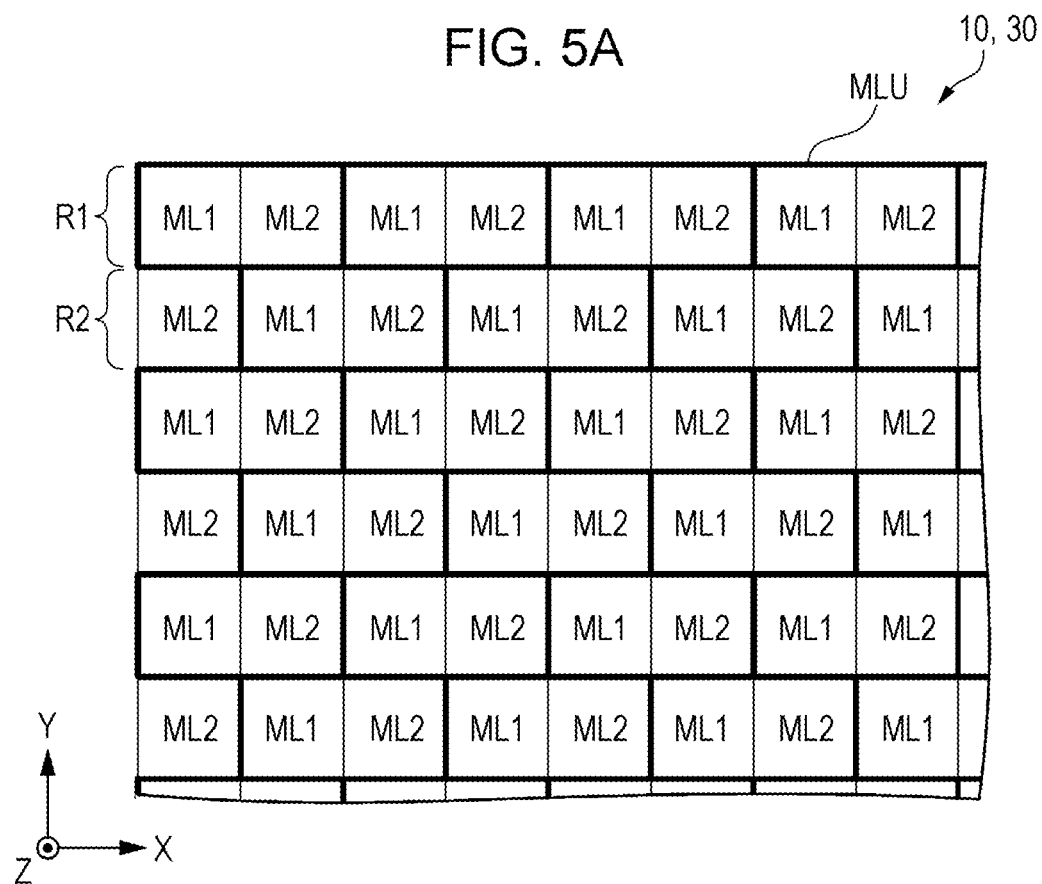
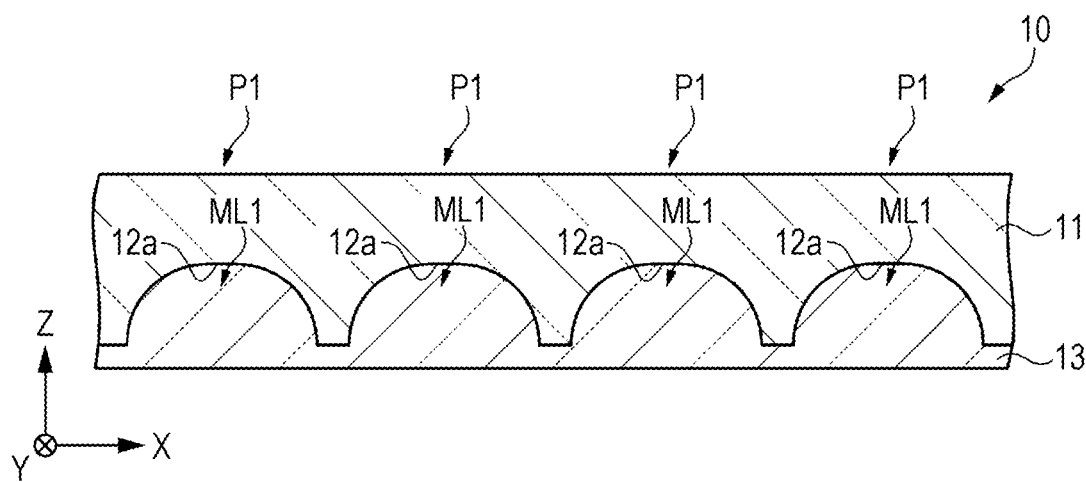

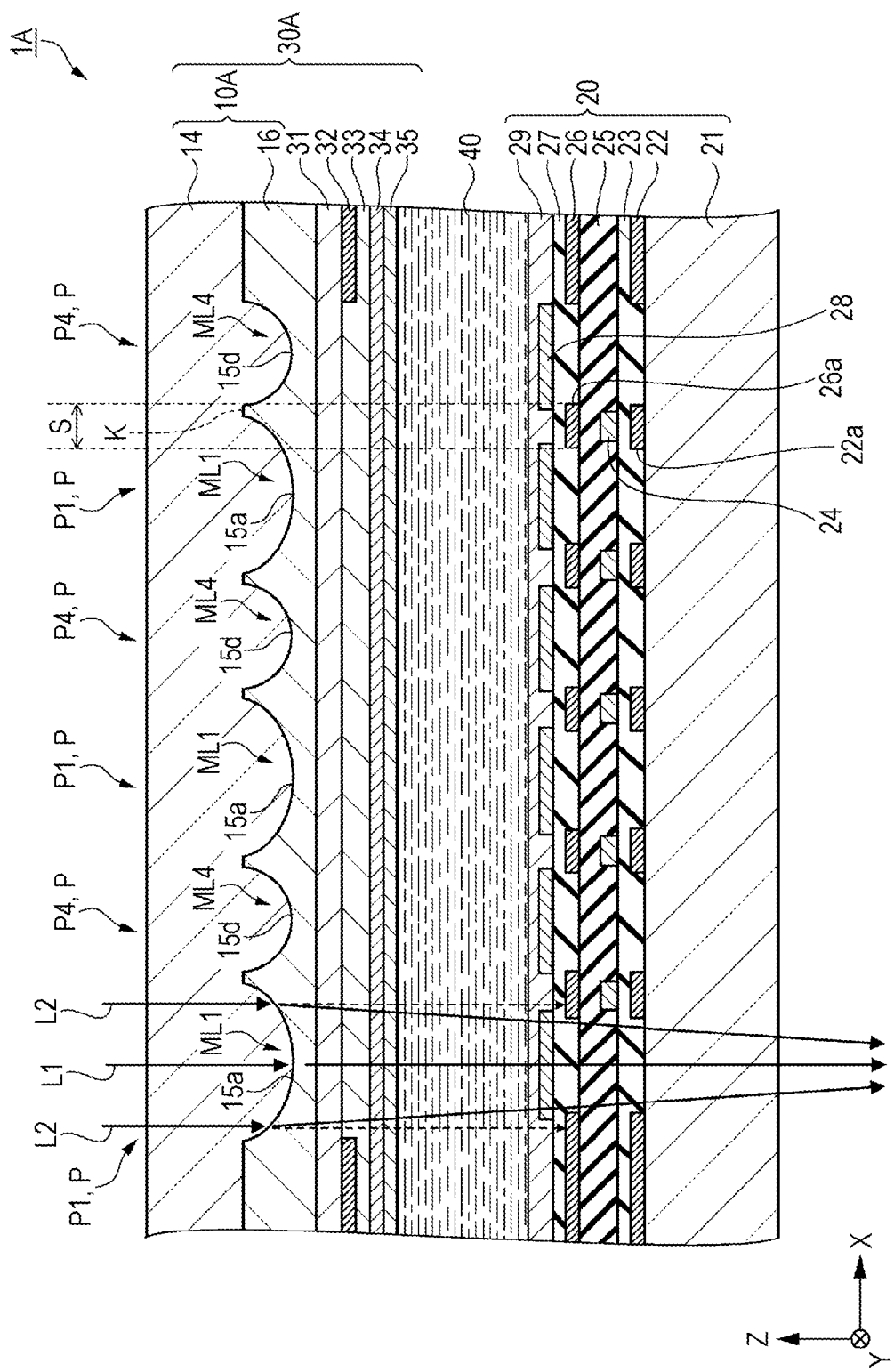

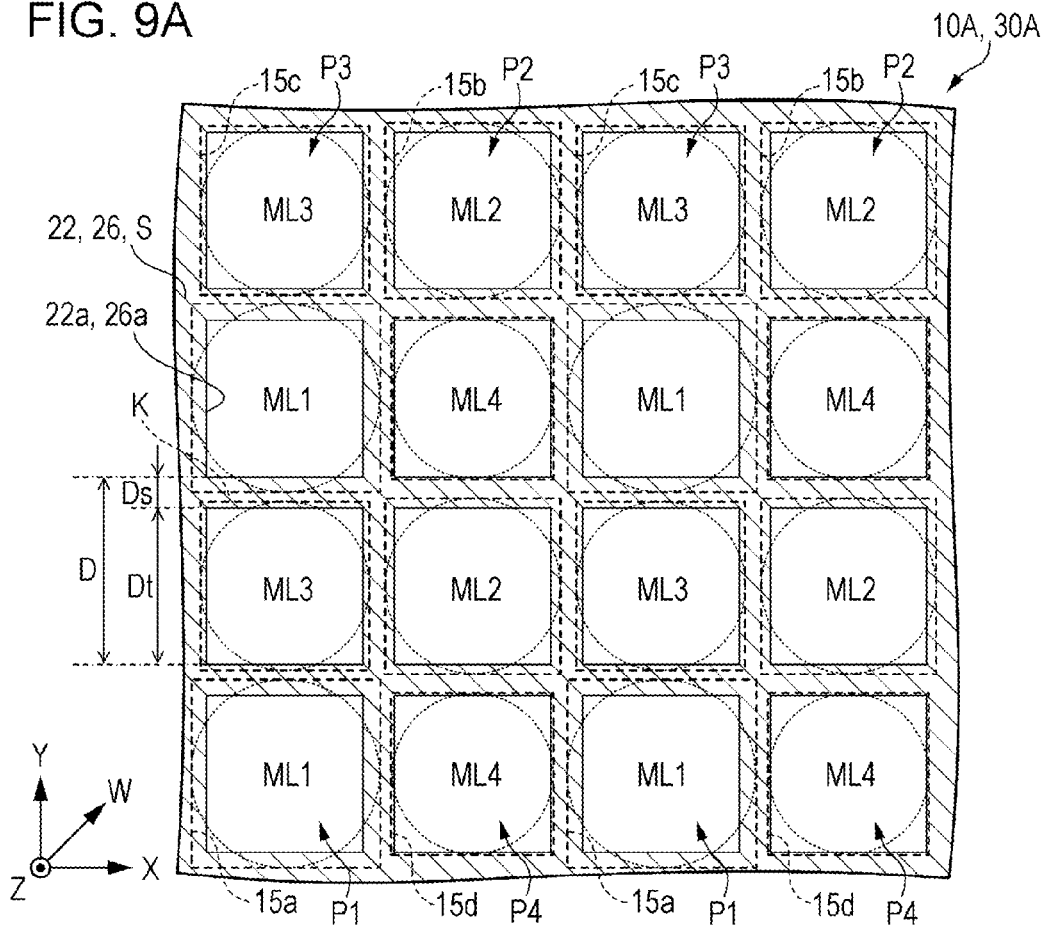

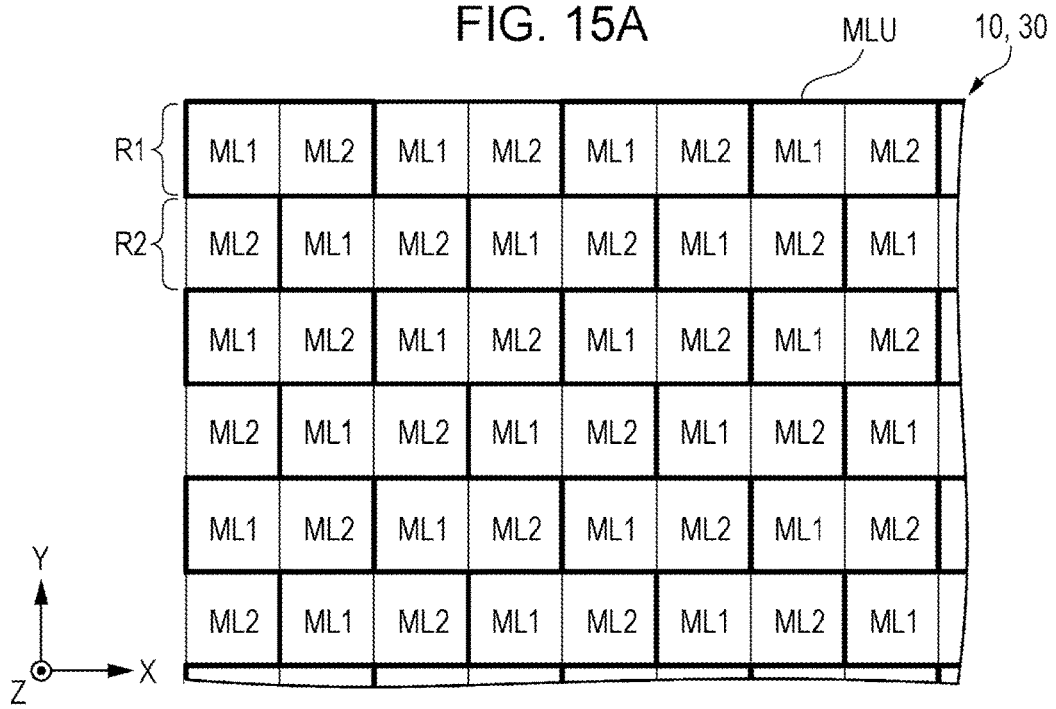
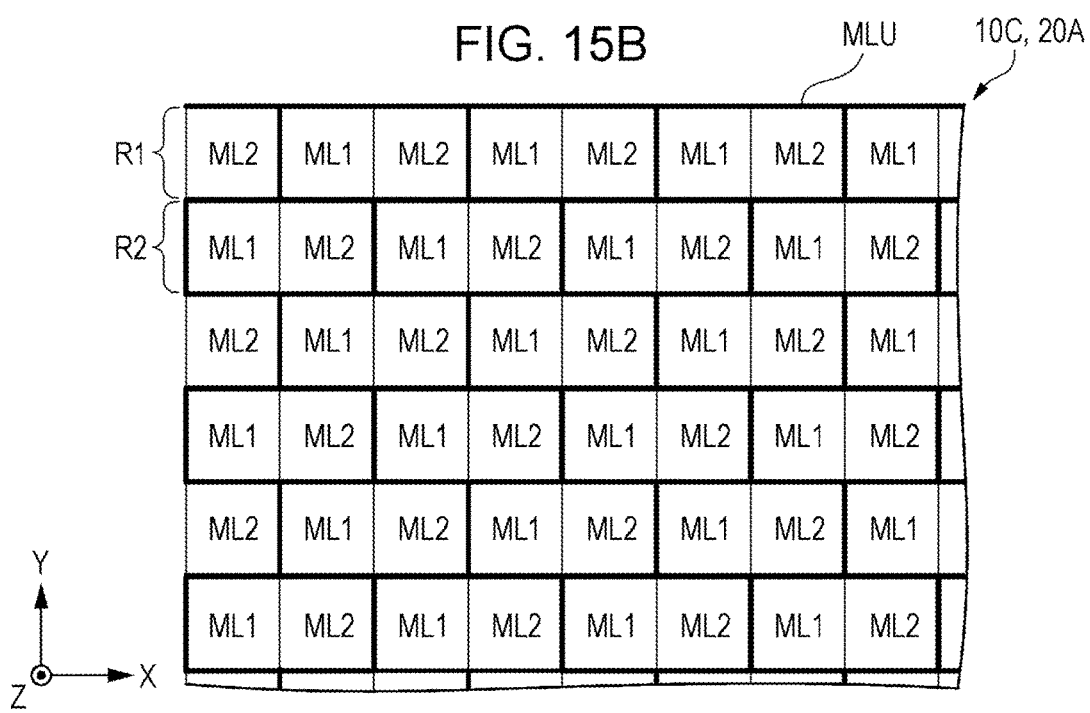

FIG. 17A

|  | | | | | | | | | MLU |
|---|---|---|---|---|---|---|---|---|---|
| R1 | ML1 | ML2 | ML3 | ML1 | ML2 | ML3 | ML1 | ML2 | ML3 |
|  | ML4 | ML5 | ML6 | ML4 | ML5 | ML6 | ML4 | ML5 | ML6 |
|  | ML7 | ML8 | ML9 | ML7 | ML8 | ML9 | ML7 | ML8 | ML9 |
| R2 | ML3 | ML1 | ML2 | ML3 | ML1 | ML2 | ML3 | ML1 | ML2 |
|  | ML6 | ML4 | ML5 | ML6 | ML4 | ML5 | ML6 | ML4 | ML5 |
|  | ML9 | ML7 | ML8 | ML9 | ML7 | ML8 | ML9 | ML7 | ML8 |
| R3 | ML2 | ML3 | ML1 | ML2 | ML3 | ML1 | ML2 | ML3 | ML1 |
|  | ML5 | ML6 | ML4 | ML5 | ML6 | ML4 | ML5 | ML6 | ML4 |
|  | ML8 | ML9 | ML7 | ML8 | ML9 | ML7 | ML8 | ML9 | ML7 |

FIG. 17B

MLU1, E

| ML1 | ML2 | ML3 | ML1 | ML2 | ML3 | ML1 | ML2 | ML3 |
|---|---|---|---|---|---|---|---|---|
| ML4 | ML5 | ML6 | ML4 | ML5 | ML6 | ML4 | ML5 | ML6 |
| ML7 | ML8 | ML9 | ML7 | ML8 | ML9 | ML7 | ML8 | ML9 |
| ML1 | ML2 | ML3 | ML1 | ML2 | ML1 | ML2 | ML1 | ML2 |
| ML4 | ML5 | ML6 | ML3 | ML4 | ML3 | ML4 | ML3 | ML4 |
| ML7 | ML8 | ML9 | ML1 | ML2 | ML1 | ML2 | ML1 | ML2 |
| ML1 | ML2 | ML3 | ML3 | ML4 | ML3 | ML4 | ML3 | ML4 |
| ML4 | ML5 | ML6 | ML1 | ML2 | ML1 | ML2 | ML1 | ML2 |
| ML7 | ML8 | ML9 | ML3 | ML4 | ML3 | ML4 | ML3 | ML4 |

MLU2

ELECTRO-OPTICAL DEVICE AND ELECTRONIC APPARATUS

BACKGROUND

1. Technical Field

The present invention relates to an electro-optical device and an electronic apparatus.

2. Related Art

There is known an electro-optical device with an electro-optical material (for example, liquid crystal or the like) provided between an element substrate and an opposing substrate. Examples of the electro-optical device include a liquid crystal device which is used as a liquid crystal light bulb of a projector. In such liquid crystal devices, there is demand to realize high efficiency for light utilization.

In the liquid crystal device, TFT elements, wiring and the like for driving pixels are provided outside of a pixel region on an element substrate, and a light shielding layer is provided to overlap these. Therefore, a portion of the incident light is blocked by the light shielding layer and is not used. Therefore, a configuration is known in which, by providing a micro lens array, on which micro lenses are arranged, on at least one of the element substrate or the opposing substrate of the liquid crystal device, the incident light is condensed by the micro lenses and the efficiency for light utilization is increased.

Incidentally, in the liquid crystal device provided with the micro lens array, since the micro lenses are arranged in an orderly (periodic) manner corresponding to the arrangement pitch of the pixels, the incident light is diffracted, diffracted light is easily generated, and the spread of the light which is emitted from the liquid crystal device may increase in size due to the diffracted light interfering with itself. When using the liquid crystal device provided with such a micro lens array as a liquid crystal light bulb of a projector, when the spread angle of the light emitted from the liquid crystal device is equal to or greater than the F number of the projection lens, there is a problem in that a portion of the light is subjected to vignetting by the projection lens and the image which is shown on a screen becomes dark. When the pixel size is reduced as the resolution of liquid crystal devices is increased, since the spread angle of the light increases due to the interference of the diffracted light, the brightness is further reduced.

For the configuration of a micro lens array capable of reducing the influence of such diffraction, a configuration has been proposed in which the period of the orderly array of micro lenses is increased by causing the optical radii of curvature of the micro lenses to differ (for example, refer to JP-A-2005-352392). JP-A-2005-352392 discloses a configuration in which the refractive index differences between the micro lenses and an adjacent member are constant and the radii of curvature of the micro lenses are caused to differ, and a configuration in which the radii of curvature of the micro lenses are the same and the refractive index differences between the micro lenses and the adjacent member are caused to differ. In either configuration, the planar shape of the micro lenses is the same.

However, JP-A-2005-352392 does not disclose a method of forming the micro lens array of the above-described configuration. Forming a plurality of micro lenses with the same planar shape and different radii of curvature in the same process by performing an isotropic etching process using a general mask is considered to be difficult. Even when the refractive index differences between the micro lenses and the adjacent member are caused to differ, the manufacturing process becomes complex due to using materials with different refractive index for each micro lens. Furthermore, when the liquid crystal device provided with a micro lens array in which the shape of curvature or the refractive index difference is caused to differ for each micro lens is used as a liquid crystal light bulb, there is a concern that the image displayed on the screen will become dark. Therefore, there is demand for a liquid crystal device which can effectively reduce the influence of the diffraction of light, and which is provided with a micro lens array that can be manufactured easily.

SUMMARY

The invention can be realized in the following forms or application examples.

Application Example 1

According to this application example, there is provided an electro-optical device including a plurality of pixels partitioned by light shielding portions. The electro-optical device includes a first substrate; a second substrate which is disposed to oppose the first substrate; an electro-optical layer which is disposed between the first substrate and the second substrate; and a plurality of micro lenses which are disposed on at least one of the first substrate and the second substrate and are arranged to correspond to the pixels. The plurality of pixels includes first pixels and second pixels which are adjacent to one another and interpose the light shielding portions therebetween. The plurality of micro lenses includes first micro lenses which correspond to the first pixels, and second micro lenses which correspond to the second pixels and have different lens diameters from the first micro lenses. A boundary between the first micro lenses and the second micro lenses is disposed in a region which overlaps the light shielding portions in plan view.

According to the configuration of this application example, the lens diameters of the first micro lenses which correspond to the first pixels differ from the lens diameters of the second micro lenses which correspond to the second pixels, which are adjacent to the first pixels. In other words, two micro lenses with different lens diameters are arranged to be adjacent to one another. Therefore, when, as in the related art, the micro lenses with the same lens diameters are arranged, the repeating pattern is per-pixel; conversely, the configuration of this application example is capable of doubling the repetition period, since the repeating pattern is provided for every two pixels. Accordingly, in comparison to a case in which, as in the related art, the micro lenses with the same lens diameters are arranged, it is possible to suppress the spread angle of the light caused by the interference of diffracted light arising from the micro lenses. It is possible to form the first micro lenses and the second micro lenses, in which the lens diameters are alternately different, in the same process by performing an etching process or the like using masks in which the opening diameters of the opening portions are different, for example. Accordingly, it is possible to provide the liquid crystal device which can reduce the influence of the diffraction of light, and which includes the micro lens array that can be manufactured easily.

Application Example 2

In the electro-optical device according to the application example, it is preferable that the plurality of pixels be arranged at a predetermined pitch in a first direction and a second direction which intersects the first direction.

According to the configuration of this application example, the plurality of pixels is arranged at a predetermined pitch in the first direction and the second direction which intersect one another. Therefore, it is possible to set the aperture ratio of the pixels, the arrangement and the like of the switching elements in relation to the light shielding portions and the wiring to the same conditions in relation to each pixel. Therefore, it is possible to suppress a reduction in the brightness in comparison to a case in which the disposition pitch of the pixels differs.

Application Example 3

In the electro-optical device according to this application example, it is preferable that the plurality of micro lenses be arranged repeatedly, and a unit thereof be m (where m is a natural number of 1 or greater)×n (where n is a natural number of 2 or greater) micro lenses with alternately different lens diameters including the first micro lenses and the second micro lenses.

According to the configuration of this application example, since the m×n micro lenses in which the lens diameters are alternately different are arranged to repeat as units, by increasing the number of at least one of m and n, it is possible to further increase the repetition period of the micro lenses with different lens diameters. Accordingly, it is possible to further reduce the influence of the diffraction of the light.

Application Example 4

It is preferable that the electro-optical device according to this application example further include a first row in which the m×n micro lenses are arranged repeatedly along the first direction; and a second row, which is adjacent to the first row, in which the m×n micro lenses are arranged repeatedly along the first direction, and that the m×n micro lenses which are arranged in the first row and the m×n micro lenses which are arranged in the second row be disposed to be shifted alternately in the first direction.

According to the configuration of this application example, the m×n micro lenses which are arranged repeatedly in the first row and the m×n micro lenses which are arranged repeatedly in the second row which is adjacent to the first row are disposed to be shifted alternately in the first direction. Therefore, it is possible to further increase the repetition period of the micro lenses with different lens diameters in comparison to a case in which the m×n micro lenses are not disposed to be shifted when comparing the first row and the second row. Accordingly, it is possible to more effectively reduce the influence of the diffraction of the light.

Application Example 5

In the electro-optical device according to this application example, it is preferable that both the first substrate and the second substrate be provided with the plurality of micro lenses, and that the m×n micro lenses which are arranged on the first substrate and the m×n micro lenses which are arranged on the second substrate be disposed to be shifted alternately in at least one of the first direction and the second direction in plan view.

According to the configuration of the application example, since both the first substrate and the second substrate are provided with the plurality of micro lenses, it is possible to suppress the spreading of the light which is emitted from the electro-optical device by restoring the angle of the condensed light using the micro lenses of the substrate of the emission side in addition to improving the efficiency for light utilization by condensing the light using the micro lenses of the substrate of the incidence side. Since the m×n micro lenses are disposed to be shifted alternately in at least one direction when comparing the first substrate and the second substrate, in comparison to a case in which the m×n micro lenses are not shifted alternately, it is possible to further suppress the spread angle of the light caused by the interference of diffracted light arising from the micro lenses.

Application Example 6

According to this application example, there is provided an electronic apparatus which includes the electro-optical device according to the above application examples.

According to the configuration of this application example, it is possible to provide an electronic apparatus with a bright display and excellent cost competitiveness, since the electronic apparatus is provided with the electro-optical device which can effectively reduce the influence of the diffraction of light, and which includes the micro lens array that can be manufactured easily.

BRIEF DESCRIPTION OF THE DRAWINGS

The invention will be described with reference to the accompanying drawings, wherein like numbers reference like elements.

FIGS. 5A and 5B are schematic diagrams showing the configuration of the micro lens substrate according to the first embodiment.

FIG. 8 is a schematic cross-sectional diagram showing a configuration of a liquid crystal device according to a second embodiment.

FIGS. 9A and 9B are schematic diagrams showing the configuration of a micro lens substrate according to the second embodiment.

FIGS. 15A and 15B are schematic plan views showing the configuration of a micro lens substrate according to the fourth embodiment.

FIGS. 17A and 17B are schematic plan views showing the configuration of a micro lens substrate according to a modification example.

DESCRIPTION OF EXEMPLARY EMBODIMENTS

Hereinafter, the embodiments that embody the invention will be described with reference to the drawings. The drawings used are shown enlarged, reduced, or emphasized such that the portions being described are visually recognizable. There are also cases in which depiction of components other than those necessary for the description is omitted.

Note that, in the embodiments described hereinafter, when the phrase "on the substrate" is used, for example, this can represent a case in which a part is disposed on the substrate to make contact therewith, a case in which a part is disposed on the substrate via another component, or a case in which a part is disposed on the substrate such that a portion of the part makes contact with the substrate and another portion of the part is disposed on the substrate via another component.

First Embodiment

Electro-Optical Device

Here, description is given exemplifying an active matrix liquid crystal device, which is provided with a Thin Film Transistor (TFT) as a pixel switching element, as the electro-optical device. For example, the liquid crystal device can be favorably used as a light modulating element (a liquid crystal light bulb) of a projection-type display device (a projector) described later.

Figure 1:
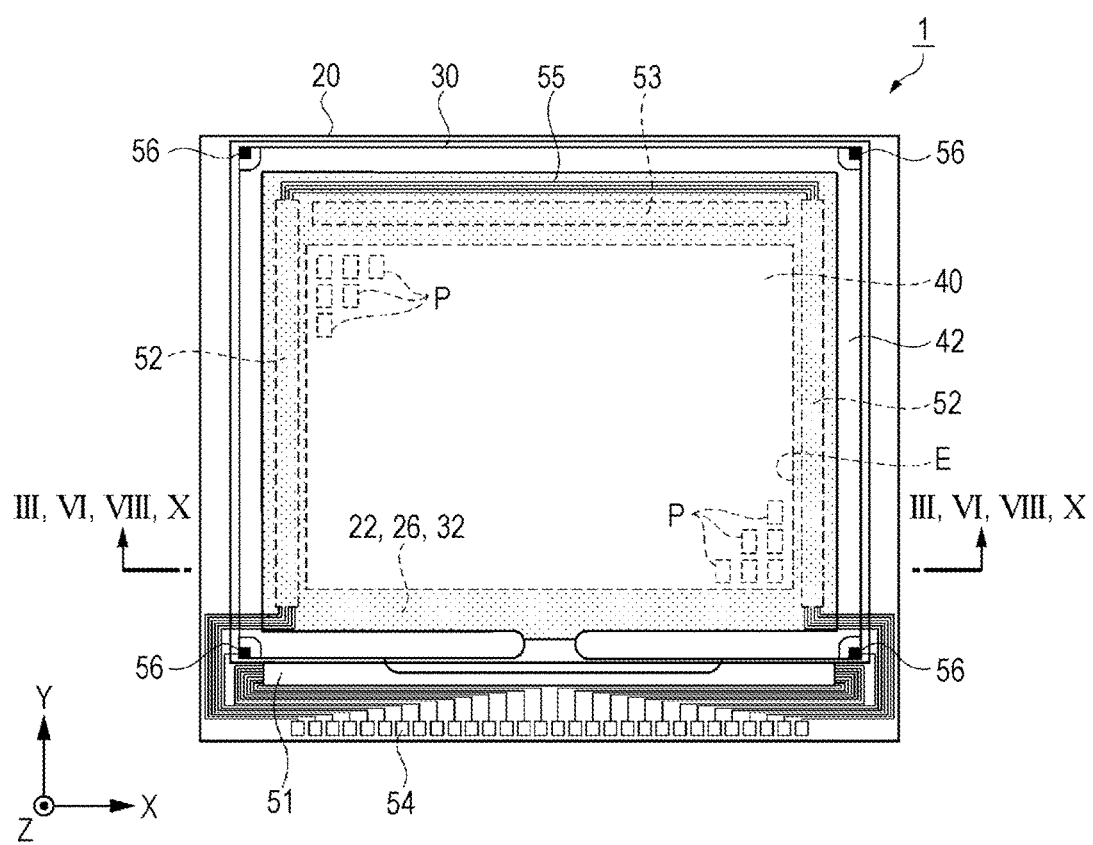
FIG. 1 is a schematic plan view showing a configuration of a liquid crystal device according to a first embodiment.
Figure 2:
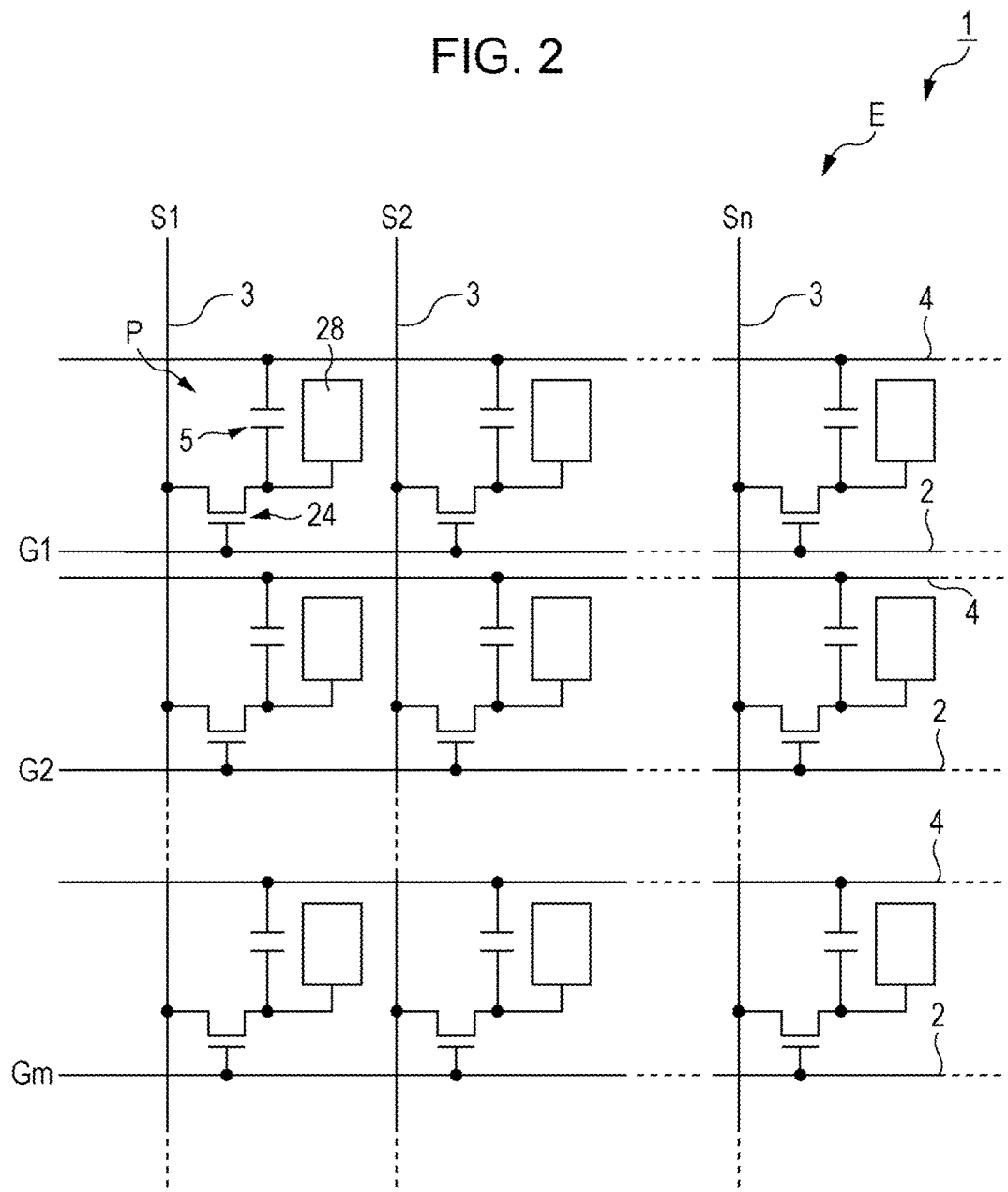
FIG. 2 is an equivalent circuit diagram showing the electrical configuration of the liquid crystal device according to the first embodiment.
Figure 3:
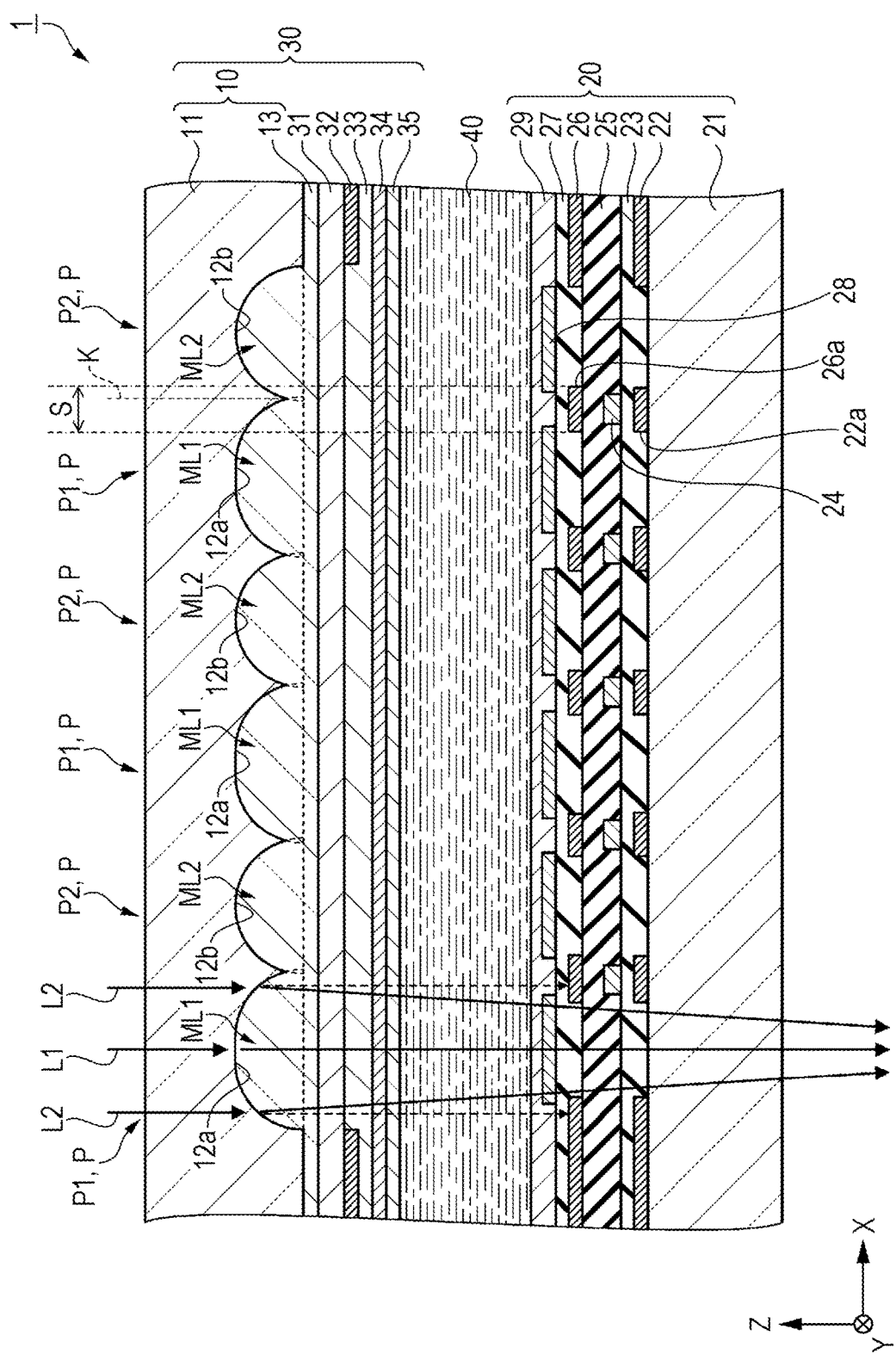
FIG. 3 is a schematic cross-sectional diagram showing a configuration of the liquid crystal device according to the first embodiment.

First, description will be given of the liquid crystal device as the electro-optical device according to the first embodiment, with reference to FIGS. 1 to 3. FIG. 1 is a schematic plan view showing the configuration of the liquid crystal device according to the first embodiment. FIG. 2 is an equivalent circuit diagram showing the electrical configuration of the liquid crystal device according to the first embodiment. FIG. 3 is a schematic cross-sectional diagram showing a configuration of the liquid crystal device according to the first embodiment. Specifically, FIG. 3 is a schematic cross-sectional view along the III-III line of FIG. 1.

As shown in FIGS. 1 and 3, a liquid crystal device 1 according to the first embodiment is provided with an element substrate 20 as the first substrate, an opposing substrate 30 as the second substrate which is disposed to oppose the element substrate 20, a seal member 42, and a liquid crystal layer 40 as the electro-optical layer. The element substrate 20 and the opposing substrate 30 are disposed to oppose one another. As shown in FIG. 1, the element substrate 20 is larger than the opposing substrate 30, and the substrates are bonded to one another via a seal member 42 which is disposed in a frame shape along the edge portion of the opposing substrate 30.

The liquid crystal layer 40 is configured of liquid crystals with positive or negative dielectric anisotropy which are sealed in a space surrounded by the element substrate 20, the opposing substrate 30, and the seal member 42. The seal member 42 is formed of an adhesive such as a heat curing or an ultraviolet curing epoxy resin, for example. Spacers (not shown) for maintaining a fixed interval between the element substrate 20 and the opposing substrate 30 are mixed into the seal member 42.

Light shielding layers 22, 26, and 32 are provided on the inside of the seal member 42, which is disposed in a frame shape, as the light shielding portion which has a frame shaped peripheral edge portion. The light shielding layers 22, 26, and 32 are formed of a metal or a metallic oxide with light shielding properties, for example. The inside of the light shielding layers 22, 26, and 32 is a display region E in which a plurality of pixels P including pixels P1 and pixels P2 (refer to FIG. 3) are arranged. The pixels P are substantially rectangular and are arranged in a matrix.

The display region E is a region that actually contributes to the display in the liquid crystal device 1. In the display region E, the light shielding layers 22 and 26 are provided in a lattice, for example, so as to partition the plurality of pixels P in a planar manner. Note that, the liquid crystal device 1 may be provided with a dummy region which is provided to surround the periphery of the display region E and does not actually contribute to the display.

A data line drive circuit 51 and a plurality of external connection terminals 54 are provided along a first side of the element substrate 20 on an opposite side thereof from the display region E of the seal member 42, which is formed along the first side. A test circuit 53 is provided on the display region E side of the seal member 42 which runs along another second side that opposes the first side. Scan line drive circuits 52 are provided on the inside of the seal member 42 which runs along the other two sides, which are perpendicular to the two sides described above and oppose one another.

A plurality of wirings 55 which connect the two scan line drive circuits 52 are provided on the display region E side of the seal member 42 of the second side on which the test circuit 53 is provided. The wiring which is connected to the data line drive circuit 51 and the scan line drive circuit 52 is connected to a plurality of external connection terminals 54. Vertical electrical connection portions 56 for electrically connecting between the element substrate 20 and the opposing substrate 30 are provided on the corner portions of the opposing substrate 30. Note that, the disposition of the test circuit 53 is not limited to that described above, and the test circuit 53 may be provided in a position along the inside of the seal member 42 between the data line drive circuit 51 and the display region E.

In the description hereinafter, a direction along the first side at which the data line drive circuit 51 is provided is set to an X direction as the first direction, and a direction along the other two sides, which are perpendicular to the first side and oppose one another, is set to a Y direction as the second direction. The X direction is a direction along the III-III line of FIG. 1. The light shielding layers 22 (26, and 32) are provided in a lattice along the X direction and the Y direction. The pixels P are partitioned into a lattice by the light shielding layer 22, and are arranged in a matrix pattern along the X direction and the Y direction.

A direction that is perpendicular to the X direction and the Y direction and proceeds upward in FIG. 1 is set to a Z direction. Note that, in the present specification, viewing the surface of the opposing substrate 30 side of the liquid crystal device 1 from a normal line direction (the Z direction) is referred to as "plan view".

As shown in FIG. 2, in the display region E, scan lines 2 and data lines 3 are formed to intersect one another, and the pixels P are provided corresponding to the intersections between the scan lines 2 and the data lines 3. Each of the pixels P is provided with a pixel electrode 28 and a TFT 24 as the switching element.

The source electrode (not shown) of the TFT 24 is electrically connected to the data line 3 which extends from the data line drive circuit 51. Image signals (data signals) S1, S2, . . . , Sn are supplied to the data lines 3 in line order from the data line drive circuit 51 (refer to FIG. 1). The gate electrode (not shown) of the TFT 24 is a portion of the scan line 2 that extends from the scan line drive circuit 52. Scan signals G1, G2, . . . , Gm are supplied to the scan lines 2 in line order from the scan line drive circuit 52. The drain electrode (not shown) of the TFT 24 is electrically connected to the pixel electrode 28.

The image signals S1, S2, . . . , Sn are written to the pixel electrodes 28 at predetermined timings via the data lines 3 by setting the TFTs 24 to the ON state for a fixed period only. The image signal of a predetermined level which is written to the liquid crystal layer 40 via the pixel electrode 28 in this manner is held for a fixed period in a liquid crystal capacitor which is formed between the pixel electrode 28 and the common electrode 34 which is provided on the opposing substrate 30 (refer to FIG. 3).

Note that, in order to prevent the held image signals S1, S2, . . . , Sn from leaking, a storage capacitor 5 is formed between a capacitor line 4 that is formed along the scan line 2 and the pixel electrode 28, and is disposed parallel to the liquid crystal capacitor. In this manner, when a voltage signal is applied to the liquid crystal of each of the pixels P, the orientation state of the liquid crystal changes according to the applied voltage level. Accordingly, the light that is incident on the liquid crystal layer 40 (refer to FIG. 3) is modulated and gradation display is possible.

The liquid crystal which configures the liquid crystal layer 40 enables gradation display by modulating light due to the orientation or the order of the molecular assembly changing according to the applied voltage level. For example, when a normally white mode is adopted, the transmittance in relation to incident light is reduced in units of each of the pixels P according to the applied voltage. When a normally black mode is adopted, the transmittance in relation to incident light is increased in units of each of the pixels P according to the applied voltage, and overall, light with a contrast corresponding to the image signal is emitted from the liquid crystal device 1.

As shown in FIG. 3, for the plurality of pixels P, the liquid crystal device 1 according to the first embodiment 1 includes the pixels P1 as the first pixels and the pixels P2 as the second pixels. The opposing substrate 30 is provided with a micro lens array substrate 10, an optical path length adjustment layer 31, a light shielding layer 32, a protection layer 33, a common electrode 34, and an orientation film 35.

The micro lens array substrate 10 is provided with a substrate 11, and a light transmitting layer 13. The substrate 11 is formed of an inorganic material that has optical transparency such as glass or quartz, for example. The substrate 11 includes concave portions 12a and concave portions 12b which are formed a surface thereof on the liquid crystal layer 40 side. The concave portions 12a and the concave portions 12b are formed to spread from the bottom portion sides thereof toward the liquid crystal layer 40 side.

The concave portions 12a are disposed corresponding to the pixels P1. The concave portions 12b are disposed corresponding to the pixels P2. The pixels P1 and the pixels P2 are disposed to be adjacent to one another such that light shielding regions S, which overlap with the light shielding layers 22, 26 in plan view, are interposed therebetween. Therefore, the concave portions 12a and the concave portions 12b are disposed to be adjacent to one another. The concave portions 12a and the concave portions 12b are adjacent, are in contact with one another, and are disposed such that boundaries K between the concave portions 12a and the concave portions 12b overlap the light shielding regions S in plan view.

The light transmitting layer 13 is provided to cover the substrate 11. The light transmitting layer 13 is formed to fill the concave portions 12a and the concave portions 12b. The light transmitting layer 13 is formed of a material which has optical transparency and a different refractive index from the substrate 11. More specifically, the light transmitting layer 13 is formed of an inorganic material with a higher optical refractive index than the substrate 11. Examples of the inorganic material include SiON and Al2O3.

Convex micro lenses ML1 are configured as the first micro lenses by filling the convex portions 12a with the material that forms the light transmitting layer 13. Convex micro lenses ML2 are configured as the second micro lenses by filling the convex portions 12b with the material that forms the light transmitting layer 13. The lens diameters of the micro lenses ML1 and the micro lens ML2 are different, and the lens diameters of the micro lenses ML1 are larger than the lens diameters of the micro lenses ML2.

The light transmitting layer 13 is formed thicker than the depth of the concave portions 12a and the concave portions 12b, and the surface of the light transmitting layer 13 is a substantially planar surface. In other words, the light transmitting layer 13 includes a portion which fills the concave portions 12a and the concave portions 12b to form the micro lenses ML1 and the micro lenses ML2, and a portion that covers the upper surface of the substrate 11, the micro lenses ML1, and the micro lenses ML2 to perform the role of a planarization layer.

The optical path length adjustment layer 31 is provided to cover the micro lens array substrate 10. The optical path length adjustment layer 31 is formed of an inorganic material that has optical transparency and a refractive index approximately the same as that of the substrate 11. The optical path length adjustment layer 31 has a function of setting the distance from the micro lenses ML1 and the micro lenses ML2 to the light shielding layer 26 to match a desired value. Therefore, the layer thickness of the optical path length adjustment layer 31 is set appropriately on the basis of optical conditions such as the focal lengths of the micro lenses ML1 and micro lenses ML2 according to the wavelength of the light.

The light shielding layer 32 is provided on the optical path length adjustment layer 31. The light shielding layer 32 is provided to surround the periphery of the display region E (refer to FIG. 1) in which the micro lenses ML1 and ML2 are disposed. The light shielding layer 32 is also provided within the display region E, and may be formed in a lattice, an island pattern, or a striped pattern to overlap the light shielding layer 22 and the light shielding layer 26 of the element substrate 20 in plan view.

The protection layer 33 is provided to cover the optical path length adjustment layer 31 and the light shielding layer 32. The common electrode 34 is provided to cover the protection layer 33. The common electrode 34 is formed across the plurality of pixels P. The common electrode 34 is formed of a transparent conductive film such as Indium Tin Oxide (ITO) or Indium Zinc Oxide (IZO). The orientation film 35 is provided to cover the common electrode 34.

Note that, the protection layer 33 covers the light shielding layer 32 such that the surface of the common electrode 34 on the liquid crystal layer 40 side is planar, and is not an essential component; for example, the common electrode 34 may be formed to directly cover the conductive light shielding layer 32.

The element substrate 20 is provided with a substrate 21, the light shielding layer 22, an insulating layer 23, the TFTs 24, an insulating layer 25, the light shielding layer 26, an insulating layer 27, the pixel electrodes 28, and the orientation film 29. The substrate 21 is formed of a material that has optical transparency such as glass or quartz, for example.

The light shielding layer 22 is provided on the substrate 21. The light shielding layer 22 is formed in a lattice to overlap the light shielding layer 26 of an upper layer in plan view. The light shielding layer 22 and the light shielding layer 26 are disposed to interpose the TFT 24 therebetween in the thickness direction (the Z direction) of the element substrate 20. The light shielding layer 22 overlaps at least the channel region of the TFT 24 in plan view. The incidence of light on the TFT 24 is suppressed by providing the light shielding layer 22 and the light shielding layer 26. A region that is surrounded by the light shielding layer 22 (within an opening portion 22a), and a region surrounded by the light shielding layer 26 (within an opening portion 26a) overlap one another in plan view and are regions that transmit light.

The insulating layer 23 is provided to cover the substrate 21 and the light shielding layer 22. The insulating layer 23 is formed of an inorganic material such as SiO2, for example.

The TFT 24 is provided on the insulating layer 23. The TFT 24 is a switching element that drives the pixel electrode 28. The TFT 24 is configured of a semiconductor layer, a gate electrode, a source electrode, and a drain electrode (none of which are shown). A source region, a channel region, and a drain region are formed in the semiconductor layer. A Lightly Doped Drain (LDD) region may be formed in the interface between the channel region and the source region, or, between the channel region and the drain region.

The gate electrode is formed in a region of the element substrate 20 which overlaps the channel region of the semiconductor layer in plan view via a portion (the gate insulation film) of the insulating layer 25. While not depicted in the drawings, the gate electrode is electrically connected to the scan line that is disposed on the lower layer side via a contact hole, and the TFT 24 is controlled to turn ON or OFF by the application of a scan signal.

The insulating layer 25 is provided to cover the insulating layer 23 and the TFT 24. The insulating layer 25 is formed of an inorganic material such as SiO2, for example. The insulating layer 25 includes a gate insulation film that isolates the semiconductor layer of the TFT 24 from the gate electrode. Unevenness that occurs in the surface due to the TFTs 24 is alleviated by the insulating layer 25. The light shielding layer 26 is provided on the insulating layer 25. The insulating layer 27 that is formed of an inorganic material is provided to cover the insulating layer 25 and the light shielding layer 26.

The pixel electrodes 28 are provided on the insulating layer 27 to correspond to the pixels P1 and P2. The pixel electrodes 28 are disposed in a region that overlaps the opening portion 22a of the light shielding layer 22, and the opening portion 26a of the light shielding layer 26 in plan view. The pixel electrodes 28 are formed of a transparent conductive film such as Indium Tin Oxide (ITO) or Indium Zinc Oxide (IZO). The orientation film 29 is provided to cover the pixel electrodes 28. The liquid crystal layer 40 is sealed between the orientation film 29 of the element substrate 20 side and the orientation film 35 of the opposing substrate 30 side.

Note that, the TFT 24 and the electrodes, wiring and the like (not shown) that supply an electrical signal to the TFT 24 are provided in a region that overlaps the light shielding layer 22 and the light shielding layer 26 in plan view. The electrodes, wiring and the like may also function as the light shielding layer 22 and the light shielding layer 26.

In the liquid crystal device 1 according to the first embodiment, the light which is emitted from a light source or the like enters from the opposing substrate 30, which is provided with the micro lenses ML1 and ML2, (the substrate 11) side, and is condensed by the micro lenses ML1 and ML2. For example, of the light that is incident on the micro lens ML1 from the substrate 11 side, incident light L1 that enters along the optical axis and passes through the planar center of the pixel P1 proceeds directly through the micro lens ML1, passes through the liquid crystal layer 40 and is emitted therefrom, to the element substrate 20.

If incident light L2 that enters the peripheral edge portion of the micro lens ML1 from a region that is closer to the outside than the incident light L1 and overlaps the light shielding layer 26 in plan view hypothetically proceeds directly, it would be blocked by the light shielding layer 26 as shown by the broken lines; however, the incident light L2 is refracted toward the planar center of the pixel P1 due to the refractive index difference between the substrate 11 and the light transmitting layer 13. In the liquid crystal device 1, even when the incident light L2 proceeds directly and is blocked by the light shielding layer 26, it is possible to cause the incident light L2 to enter the opening portion 26a of the light shielding layer 26 using the light condensing effect of the micro lens ML1 to cause the incident light L2 to pass through the liquid crystal layer 40. As a result, since it is possible to increase the amount of light being emitted from the element substrate 20 side, it is possible to increase the efficiency for light utilization.

Micro Lens Array Substrate

Figure 4:
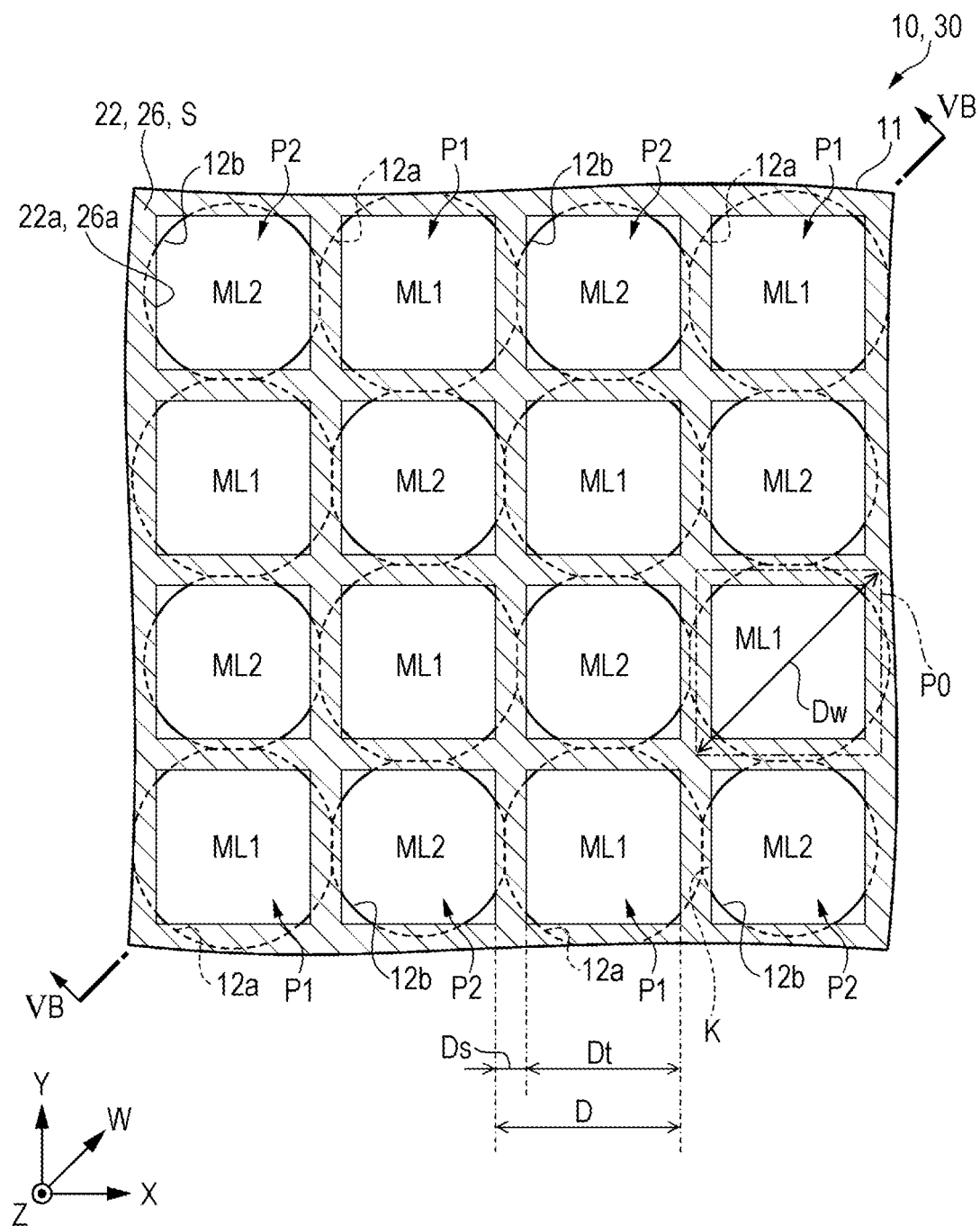
FIG. 4 is a schematic diagram showing the configuration of a micro lens substrate according to the first embodiment.

Next, description will be given of the configuration of the micro lenses ML1 and ML2 which are contained by the micro lens array substrate 10 according to the first embodiment, with reference to FIGS. 4 to 5B. FIGS. 4 to 5B are schematic diagrams showing the configuration of the micro lens substrate according to the first embodiment. Specifically, FIG. 4 is a schematic plan view showing the configuration of the micro lens substrate according to the first embodiment. FIG. 5A is a plan view showing the arrangement of the micro lenses in the micro lens substrate, and FIG. 5B is a schematic cross-sectional diagram along the VB-VB line of FIG. 4

As shown in FIG. 4, the pixels P1 and the pixels P2 are arranged to line up alternately in the X direction and the Y direction. As described above, the pixels P1 and the pixels P2 are partitioned by the light shielding layers 22 and 26 of the element substrate 20. In FIG. 4, the light shielding region S in which the light shielding layers 22 and 26 are disposed is indicated using diagonal shading. The inside of the substantially rectangular opening portions 22a and 26a which are provided in the light shielding layers 22 and 26 forms a region of the pixel P1 and the pixel P2 through which light is transmitted. The area of the region of the pixel P1 and the area of the region of the pixel P2 are approximately the same.

When the width of the light shielding layers 22 and 26 (the light shielding region S) in the X direction is set to Ds, and the width of the opening portions 22a and 26a (the regions of the pixels P1 and P2) is set to Dt, the pixels P1 and the pixels P2 are arranged at a predetermined pitch defined as D=Ds+Dt. The pixels P1 and the pixels P2 are also arranged at a predetermined pitch defined as D=Ds+Dt in the Y direction. In the present embodiment, the width Ds of the light shielding layers 22 and 26 is approximately 1.5 µm, for example, and the width Dt of the opening portions 22a and 26a is approximately 7 µm, for example. Therefore, the disposition pitch D between the pixels P1 and the pixels P2 is approximately 8.5 µm.

The micro lenses ML1 (the concave portions 12a) and the micro lenses ML2 (the concave portion 12b) are arranged to line up alternately in the X direction and the Y direction to correspond to the pixels P1 and P2. The micro lenses ML1 and the micro lenses ML2 have a substantially circular planar shape. The lens diameter (the diameter) of the micro lens ML1 is larger than the lens diameter (the diameter) of the micro lens ML2.

The micro lens ML1 and the micro lens ML2 are provided to contact one another in the X direction and the Y direction. The boundary K between the micro lens ML1 and the micro lens ML2 which contact one another in the X direction and the Y direction is disposed in a region that overlaps the light shielding layers 22 and 26 (the light shielding region S) in plan view. Therefore, the lens diameters of the micro lenses ML1 and ML2 are equal to or greater than the width Dt of an opening portion 32a.

Here, a square formed by joining the central points of each intersection of the light shielding layers 22 and 26 in the four corners of each of the pixels P1 and P2 is set to P0. The length of one side of one side of P0 is set to ½ Ds+Dt+½ Ds=D. When the length of a diagonal line of the square P0 is set to Dw (where Dw is the square route of 2×Ds), it is preferable that the lens diameter of the micro lenses ML1 and ML2 be 95% or less of the length Dw of the diagonal line of P0.

In the directions of the diagonal lines of the square (the W direction shown in FIG. 4 and a direction that intersects the W direction) which is formed of two sides in the X direction and two sides in the Y direction, the micro lenses ML1 or the micro lenses ML2 are arranged to line up beside one another. The adjacent micro lenses ML1 or the adjacent micro lenses ML2 are spaced apart from one another. FIG. 5B shows the cross-section of the micro lens array substrate 10 in the W direction of FIG. 4.

As shown in FIG. 5A, MLUs are arranged repeatedly on the micro lens array substrate 10, where a unit of each MLU is formed of m (where m is a natural number of 1 or greater)×n (where n is a natural number of 2 or greater) micro lenses in which the lens diameters differ alternately. In the present embodiment, as shown surrounded with thick lines in FIG. 5A, a set of the micro lens ML1 and the micro lens ML2, that is, 1×2 micro lenses form the constituent unit of the MLU.

MLUs that are formed of sets of the micro lens ML1 and the micro lens ML2 are arranged repeatedly in a row R1, which is the first row in the X direction, and in a row R2, which is the second row adjacent to the row R1. The MLUs are disposed to be shifted alternately along the X direction when comparing the row R1 and the row R2. Similarly, in rows other than the rows R1 and R2, the MLUs in adjacent rows are disposed to be shifted alternately. Note that, even when the X direction and the Y direction are switched for one another, the MLUs are shifted alternately in the same manner. Thus, description will be given hereinafter of the reason that the micro lenses ML1 and ML2 in which the lens diameters differ alternately are arranged in this manner in the micro lens array substrate 10.

While not depicted in the drawings, in the micro lens array substrate of a liquid crystal device of the related art, a plurality of micro lenses with substantially the same shape are arranged regularly (periodically) corresponding to the arrangement pitch of the pixels. Therefore, the incident light that enters the liquid crystal device is diffracted by the periodically arranged micro lenses, diffracted light is easily generated, and the spread of the light which is emitted from the liquid crystal device may increase in size when the diffracted light that is generated interferes with itself.

When using the liquid crystal device provided with such a micro lens array substrate as a liquid crystal light bulb of a projector, when the spread angle of the light emitted from the liquid crystal device is equal to or greater than the F number of the projection lens, there is a problem in that a portion of the light is subjected to vignetting by the projection lens and the image which is shown on a screen becomes dark. When the pixel size is reduced as the resolution of liquid crystal devices is increased, since the spread angle of the light increases due to the interference of the diffracted light, the brightness is further reduced.

The MLUs are arranged repeatedly on the micro lens array substrate 10 according to the present embodiment, where the unit of each MLU is 1×2 micro lenses in which the lens diameters differ alternately. Therefore, it is possible to double the repetition period for one row in the X direction in comparison to the micro lens array substrate of the related art in which micro lenses with substantially the same lens diameter are arranged repeatedly for each pixel. Since the MLUs are disposed to be shifted alternately when comparing the adjacent rows R1 and R2, it is possible to double the repetition period of the related art in both the X direction and the Y direction.

In other words, in the liquid crystal device of the related art, the repeating arrangement pattern of the micro lenses is provided for every pixel; whereas, in the liquid crystal device 1 according to the present embodiment, the arrangement pattern of the micro lenses is provided for every four pixels. Accordingly, in the liquid crystal device 1 according to the present embodiment, it is possible to further suppress the spread angle of the light caused by the interference of diffracted light arising from the micro lenses in comparison to the liquid crystal device of the related art.

Manufacturing Method of Electro-Optical Device

Next, description will be given of the manufacturing method of the liquid crystal device 1, including the manufacturing method of the micro lens array substrate 10 according to the first embodiment. FIGS. 6A to 6E are schematic cross-sectional diagrams showing the manufacturing method of the micro lens array substrate according to the first embodiment. Specifically, each of FIGS. 6A to 6E corresponds to a cross-sectional view along the III-III line of FIG. 1 in the same manner as FIG. 3; however, the view is vertically inverted in the Z direction in comparison to FIG. 3. FIG. 7 is a schematic plan view showing the configuration of a mask layer used in the manufacture of the micro lens array substrate according to the first embodiment.

Note that, while not depicted in the drawings, in the manufacturing process of the micro lens array substrate 10, processing is performed using a large substrate (a mother substrate) from which a plurality of the micro lens array substrates 10 can be taken; and finally, the plurality of micro lens array substrates 10 are obtained by cutting the mother substrate into individual pieces. Therefore, each individual process described hereinafter is performed in the mother substrate state before separating into individual pieces; however, here, description will be given of the processes in relation to an individual micro lens array substrate 10 within the mother substrate.

Figure 6A:
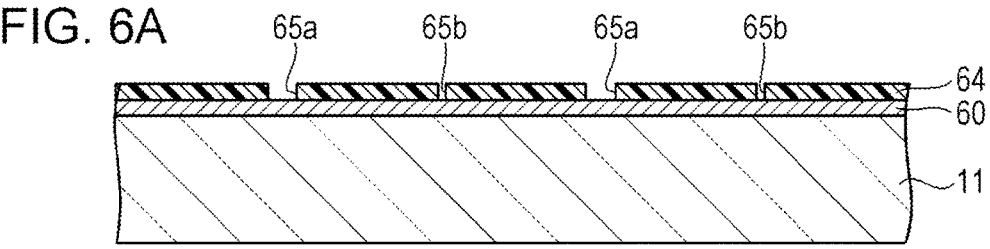
FIGS. 6A to 6E are schematic cross-sectional diagrams showing a manufacturing method of a micro lens array substrate according to the first embodiment.
Figure 7:
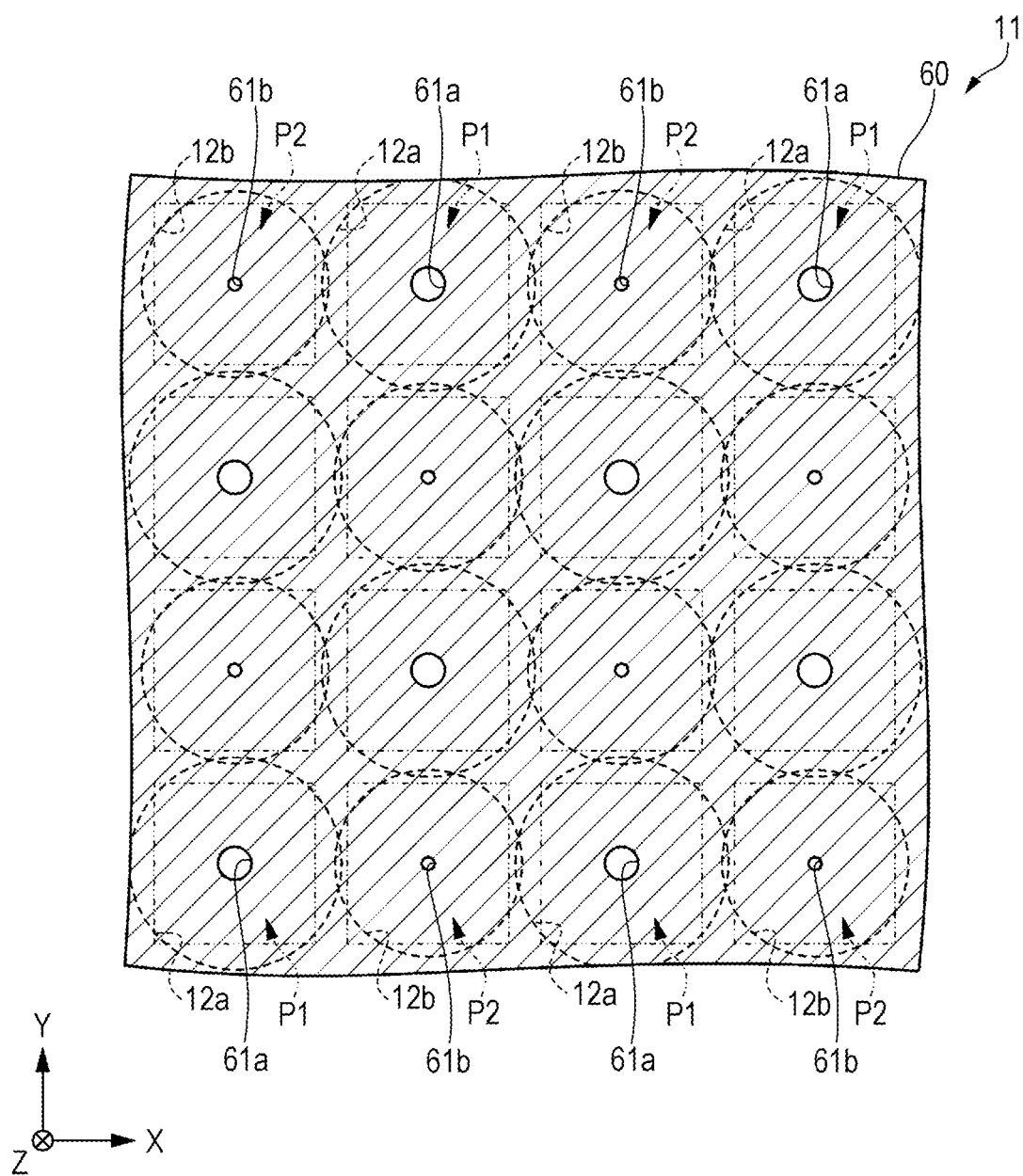
FIG. 7 is a schematic plan view showing the configuration of a mask layer used in the manufacture of the micro lens array substrate according to the first embodiment.

First, as shown in FIG. 6A, a mask layer 60 of polycrystalline silicon or the like is formed on the upper surface of the substrate 11 which is formed of quarts or the like and has optical transparency. The mask layer 60 can be formed using Chemical Vapor Deposition (CVD), sputtering, or the like. Next, a resist layer 64 is formed by applying resist onto the mask layer 60 using the spin coat method, for example. Opening portions 65a and opening portions 65b are formed in the resist layer 64 by patterning the resist layer 64 using photolithography. The opening portions 65a and the opening portion 65b are formed to correspond to opening portions 61a and opening portions 61b, respectively, of the mask layer 60 shown in FIG. 7.

Figure 6B:
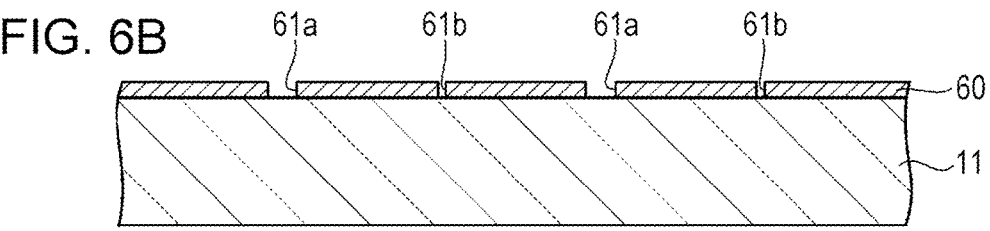

Next, as shown in FIG. 6B, the mask layer 60 is subjected to dry etching, using the resist layer 64 as the etching mask (opening portion forming process). Accordingly, the opening portions 61a are formed as the first opening portions in regions which overlap the opening portions 65a of the mask layer 60, and opening portions 61b are formed as the second opening portions in regions which overlap the opening portions 65b. After the dry etching is completed, the resist layer 64 is removed from the mask layer 60.

FIG. 7 is a plan view of the mask layer 60 which is formed on the substrate 11 as seen from above the surface of the mask layer 60. Note that, while FIG. 4 is a plan view as seen from above in the Z direction, FIG. 7 corresponds to a plan view as seen from below in the Z direction; however, a portion is shown such that the arrangement of the pixels P1 and P2 is the same as in FIG. 4. In FIG. 7, the regions of the pixels P1 and P2 are indicated with two-dot chain lines, and the positions in which the concave portions 12a and the concave portions 12b are formed in later processes are indicated with broken lines.

In the mask layer 60 indicated using diagonal shading in FIG. 7, the opening portions 61a are provided to correspond to the pixels P1, and the opening portions 61b are provided to correspond to the pixels P2. In other words, the opening portions 61a are provided to correspond to the positions in which the concave portions 12a are formed, and the opening portions 61b are provided to correspond to the positions in which the concave portions 12b are formed. The opening portions 61a and the opening portions 61b are disposed in positions which form the planar centers of the pixels P1 and the pixels P2, respectively. The opening portions 61a and the opening portions 61b have a substantially circular planar shape.

The opening diameter of the opening portion 61a is larger than the opening diameter of the opening portion 61b. When the width Dt of the opening portions 22a and 26a of the light shielding layers 22 and 26 (the pixels P1 and P2) is approximately 7 μm (refer to FIG. 4), it is possible to set the opening diameter of the opening portion 61a to approximately 1.2 μm, and the opening diameter of the opening portion 61b to approximately 0.8 μm, for example. Note that, the opening diameters of the opening portions 61a and 61b are not limited to these values; for example, the opening diameters may be set within a range of approximately 0.5 μm to 1.5 μm, for example. The opening portions 61a and 61b may have a square planar shape.

Figure 6C:
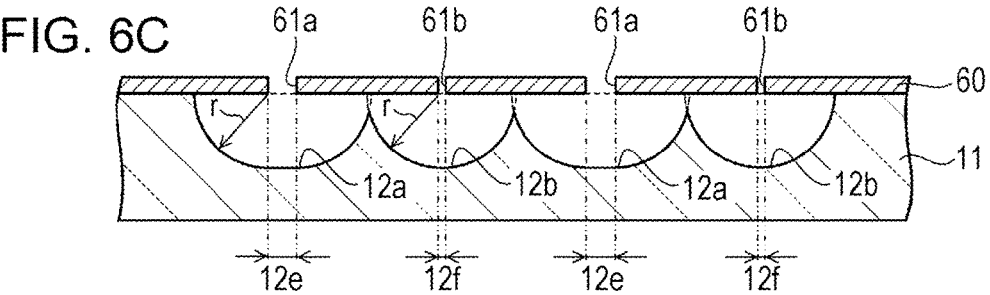

Next, from the state shown in FIG. 6B, the substrate 11 is subjected to an isotropic etching process such as wet etching, in which an etching liquid such as a hydrofluoric acid solution is used, via the mask layer 60. The substrate 11 is isotropically etched by the etching process from the upper surface side, centered on the opening portions 61a and the opening portions 61b. As a result, as shown in FIG. 6C, in the substrate 11, the concave portions 12a are formed to correspond to the opening portions 61a, and the concave portions 12b are formed to correspond to the opening portions 61b.

As shown in FIG. 7, in the etching process, the concave portions 12a are formed with the same circular centers as those of the opening portions 61a, and the concave portions 12b are formed with the same circular centers as those of the opening portions 61a in plan view. The etching amount in the planar directions (the X direction and the Y direction) from the end portions of the opening portions 61a, and the etching amount in the planar direction from the end portions of the opening portions 61b are approximately the same. Therefore, the diameters of the concave portions 12a are larger than the diameters of the concave portions 12b in plan view.

The diameter of the concave portion 12a is the lens diameter of the micro lens ML1, and the diameter of the concave portion 12b is the lens diameter of the micro lens ML2. Therefore, the opening diameters of the opening portion 61a and the opening portion 61b in the mask layer 60 are set as appropriate, the conditions of the isotropic etching process are adjusted as appropriate; thus, it is possible to set the lens diameter of the micro lens ML1 and the lens diameter of the micro lens ML2 to the respective desired magnitudes in the etching processes which use the same mask layer 60.

Note that, in the etching process, it is preferable to stop the etching process in a state in which the diameter of the concave portion 12a which is formed larger than that of the concave portion 12b is 95% or less than the length Dw (refer to FIG. 4) of the diagonal line of the square P0, which joins the center points of each intersection of the light shielding layers 22 and 26. When the etching process is performed until the diameter of the concave portion 12a exceeds 95% of the length Dw of the diagonal line, the area of the remaining portion of the substrate upper surface which supports the mask layer 60 becomes small, there is a concern that lifting will occur in the mask layer 60 during the etching process and the mask layer 60 will peel from the substrate 11.

As shown in FIG. 6C, in the etching process, the etching amount in the thickness direction (the Z direction) from the upper surface of the substrate 11 in the opening portion 61a and the etching amount in the thickness direction from the upper surface of the substrate 11 in the opening portion 61b are approximately the same. Therefore, the depth of the concave portion 12a and the depth of the concave portion 12b are approximately the same.

A portion within the concave portion 12a that overlaps the opening portion 61a in plan view is a substantially planar portion 12e, and a portion within the concave portion 12b that overlaps the opening portion 61b in plan view is a substantially planar portion 12f. A portion within the concave portion 12a excluding the substantially planar portion 12e is substantially spherical, and a portion within the concave portion 12b excluding the substantially planar portion 12f is also substantially spherical. It is possible to cause the substantially spherical portion of the concave portion 12a and the substantially spherical portion of the concave portion 12b to approach a spherical shape with a radius of r. Note that, the concave portion 12b may be formed in a state of being only the substantially spherical portion without the substantially planar portion 12f. After the etching process is completed, the mask layer 60 is removed from the substrate 11.

Figure 6D:
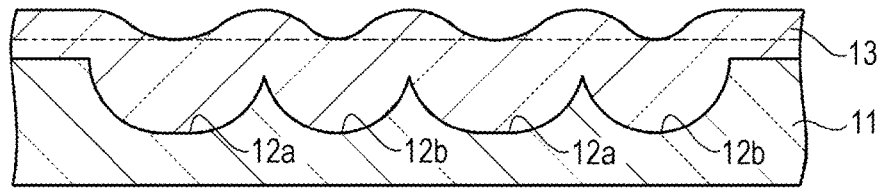

Next, as shown in FIG. 6D, the light transmitting layer 13 is formed of an inorganic material that has optical transparency and a higher refractive index than the substrate 11, is formed to cover the entire region of the substrate 11 such that the concave portions 12a and the concave portions 12b are filled. It is possible to form the light transmitting layer 13 using the CVD method, for example. Since the light transmitting layer 13 is formed to be deposited on the upper surface of the substrate 11, the surface of the light transmitting layer 13 becomes an uneven shape, reflecting the unevenness caused by the concave portions 12a and the concave portions 12b of the substrate 11.

Next, the light transmitting layer 13 shown in FIG. 6D is subjected to a planarization process. In the planarization process, a Chemical Mechanical Polishing (CMP) process or the like is used, and the upper surface of the light transmitting layer 13 is planarized by polishing and removing the portions of the upper layer of the light transmitting layer 13 in which unevenness is formed (the portion above the two-dot chain line shown in FIG. 6D).

Figure 6E:
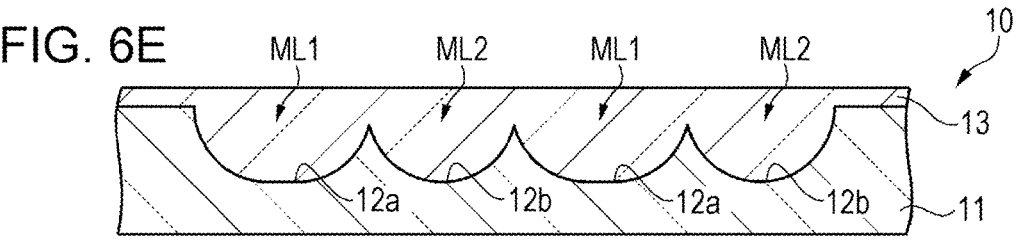

As a result of subjecting the light transmitting layer 13 to the planarization process, as shown in FIG. 6E, the upper surface of the light transmitting layer 13 is planarized and the micro lens array substrate 10 is completed. In the micro lens array substrate 10, the micro lenses ML1 are configured by the concave portions 12a being filled with the material of the light transmitting layer 13, and the micro lenses ML2 are configured by the concave portions 12b being filled with the material of the light transmitting layer 13.

The following processes will be described with reference to FIG. 3, omitting detailed depiction. Next, using well-known technology, the opposing substrate 30 is obtained by forming the optical path length adjustment layer 31, the light shielding layer 32, the protection layer 33, the common electrode 34, and the orientation film 35, in order, on the micro lens array substrate 10. The element substrate 20 is obtained by forming the light shielding layer 22, the insulating layer 23, the TFTs 24, the insulating layer 25, the light shielding layer 26, the insulating layer 27, the pixel electrodes 28, and the orientation film 29, in order, on the substrate 21.

Next, a heat curing or a light curing adhesive is disposed and cured between the element substrate 20 and the opposing substrate 30 as the seal member 42. Accordingly, the element substrate 20 and the opposing substrate 30 are bonded to one another, and the liquid crystal device 1 is completed.

As described above, in the manufacturing method of the liquid crystal device 1 according to the present embodiment, by forming the micro lenses ML1 and the micro lenses ML2, in which the lens diameters differ alternately, on the micro lens array substrate 10, the repeating arrangement pattern of the micro lenses is larger than in per-pixel, and the influence of diffraction of the light caused by the micro lenses is reduced.

For the configuration of a micro lens array capable of reducing the influence of such diffracted light, as disclosed in JP-A-2005-352392, a configuration has been proposed in which the period of the orderly array is increased by causing the optical radii of curvature of the micro lenses to differ. However, forming a plurality of micro lenses with the same planar shape and different radii of curvature in the same process by performing an isotropic etching process using a general mask is considered to be difficult. Even when the refractive index differences between the micro lenses and the adjacent member are caused to differ, the manufacturing process becomes complex due to using materials with different refractive index for each micro lens. Furthermore, when the liquid crystal device provided with a micro lens array in which the shape of curvature or the refractive index difference is caused to differ for each micro lens is used as a liquid crystal light bulb, there is a concern that the image displayed on the screen will become dark.

To counter this concern, it is possible to form the micro lenses ML1 and ML2 in which the lens diameters differ alternately in the same process by performing an etching process using the mask layer 60, in which the opening portions 61a and 61b have different opening diameters, according to the manufacturing method of the liquid crystal device 1 (micro lens array substrate 10) according to the first embodiment. Accordingly, it is possible to provide the liquid crystal device 1 which can reduce the influence of the diffraction of light, and which includes the micro lens array substrate 10 that can be manufactured easily. The micro lenses ML1 and the micro lenses ML2 are substantially spherical excluding the substantially planar portions 12e and 12f, and the refractive index difference between the substrate 11 and the light transmitting layer 13 is the same. Therefore, it is possible to render the image that is displayed on the screen brighter in comparison to that of the liquid crystal device disclosed in JPA-2005-352392.

Second Embodiment

A liquid crystal device according to the second embodiment has a configuration that is substantially the same as that of the first embodiment except in that the configuration of the micro lens array substrate is different. Here, description will be given mainly of the differences in the configuration and the manufacturing method of the micro lens array substrate in relation to the first embodiment. FIG. 8 is a schematic cross-sectional diagram showing the configuration of the liquid crystal device according to the second embodiment. FIGS. 9A and 9B are schematic diagrams showing the configuration of the micro lens substrate according to the second embodiment. Specifically, FIG. 9A is a schematic plan view showing the configuration of the micro lens substrate according to the second embodiment, and FIG. 9B is a plan view showing the arrangement of the micro lenses in the micro lens substrate. Components that are shared with the first embodiment are given the same reference numerals and description thereof will be omitted.

Electro-Optical Device

As shown in FIG. 8, a liquid crystal device 1A according to the second embodiment is provided with the element substrate 20, an opposing substrate 30A, and the liquid crystal layer 40. The opposing substrate 30A according to the second embodiment is provided with a micro lens array substrate 10A. The micro lens array substrate 10A according to the second embodiment differs from the micro lens array substrate 10 according to the first embodiment in that four micro lenses with different lens diameters are provided, and each of the micro lenses is configured of a convex portion.

The liquid crystal device 1A according to the second embodiment includes the pixels P1 and the pixels P2 (refer to FIG. 9A), and pixels P3 (refer to FIG. 9A) and pixels P4 as the plurality of pixels P. The micro lens array substrate 10A according to the second embodiment is provided with a substrate 14, and a light transmitting layer 16.

Micro Lens Array Substrate

The substrate 14 is formed of an inorganic material that has optical transparency such as SiON, for example. Convex portions 15a and convex portions 15b (refer to FIG. 9A), and convex portions 15c (refer to FIG. 9A) and convex portions 15d are provided integrally with the substrate 14 on the surface of the substrate 14 on the liquid crystal layer 40 side. The cross-sectional shape of the convex portions 15a, the convex portions 15b, the convex portions 15c, and the convex portions 15d is substantially spherical or substantially elliptical.

The light transmitting layer 16 covers the substrate 14, and is formed to fill the spaces between the convex portions (the convex portions 15a, 15b, 15c, and 15d). The light transmitting layer 16 is formed of an inorganic material that has optical transparency and a lower optical index of refraction than the substrate 14, such as SiO2. The surface of the light transmitting layer 16 is a substantially planar surface. The light transmitting layer 16 also has the role of the planarization layer in the micro lens array substrate 10A.

As shown in FIG. 9A, the convex portions 15a, 15b. 15c, and 15d are provided to correspond to the pixels P1, P2, P3, and P4, respectively. The convex portions 15a, 15b, 15c, and 15d are the micro lenses ML1, ML2, ML3, and ML4, respectively. For example, in one row along the X direction, the micro lenses ML3 and the micro lenses ML2 are disposed alternately, and in the row that is adjacent to the one row, the micro lenses ML1 and the micro lenses ML4 are disposed alternately. Note that, the pixels P1, P2, P3, and P4 are arranged at a predetermined disposition pitch D in the same manner as in the first embodiment.

The micro lenses ML1, ML2, ML3, and ML4 have substantially rectangular and planar shapes, and have mounded convex cross-sectional shapes with the planar center of each of the micro lenses as the peaks. The lens diameters (the lengths of the diagonal lines) of each of the micro lenses increase in magnitude in order of ML4<ML3<ML2<ML1. The lengths of one side of the micro lenses ML1, ML2, ML3, and ML4 are equal to or greater than the widths Dt of the opening portions 32a (the regions of the pixels P1, P2, P3, and P4).

The micro lenses ML1, ML2, ML3, and ML4 are disposed so as to be separated by the space between the micro lenses that are adjacent to one another in all of the X direction, the Y direction and the W direction. The boundary K between the micro lenses that are adjacent to one another in the X direction and the Y direction is disposed in a region that overlaps the light shielding layers 22 and 26 (the light shielding region S) in plan view.

As shown surrounded with bold lines in FIG. 9B, the MLUs are arranged repeatedly on the micro lens array substrate 10A, where the unit of each MLU is 2×2 micro lenses formed of the micro lenses ML1, ML2, ML3, and ML4 in which the lens diameters differ alternately. In the present embodiment, the MLUs are arranged repeatedly to form rows R1, R2, . . . , Rn (not shown), where the unit of each MLU is 2×2 micro lenses. The MLUs with 2×2 micro lens units are arranged without being shifted alternately when comparing the row R1 and the row R2.

The MLUs are arranged repeatedly on the micro lens array substrate 10A according to the present embodiment, where the unit of each MLU is 2×2 micro lenses in which the lens diameters differ alternately; therefore, the repeating arrangement pattern of the micro lenses is provided for every four pixels. Accordingly, in the liquid crystal device 1A according to the present embodiment, it is possible to further suppress the spread angle of the light caused by the interference of diffracted light arising from the micro lenses in comparison to the liquid crystal device of the related art.

Next, description will be given of the manufacturing method of the liquid crystal device 1A according to the second embodiment. The manufacturing method of the liquid crystal device 1A according to the second embodiment has a configuration that is substantially the same as that of the first embodiment except in that the manufacturing method of the micro lens array substrate 10A is different. Here, description will be given of the manufacturing method of the micro lens array substrate 10A according to the second embodiment.

Manufacturing Method of Electro-Optical Device

FIGS. 10A to 10E are schematic cross-sectional diagrams showing a manufacturing method of the micro lens array substrate according to the second embodiment. Each of FIGS. 10A to 10E corresponds to a cross-sectional view along the III-III line of FIG. 1 in the same manner as FIG. 8; however, the view is vertically inverted in the Z direction in comparison to FIG. 8. FIG. 11 is a schematic plan view showing the configuration of a resist portion in a patterning process of the micro lens array substrate according to the second embodiment.

Figure 10A:
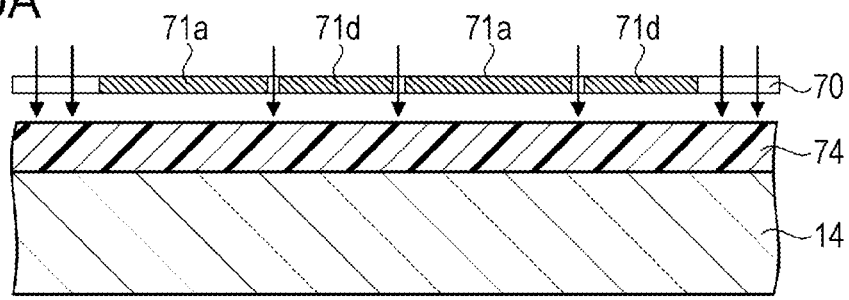
FIGS. 10A to 10E are schematic cross-sectional diagrams showing a manufacturing method of a micro lens array substrate according to the second embodiment.
Figure 11:
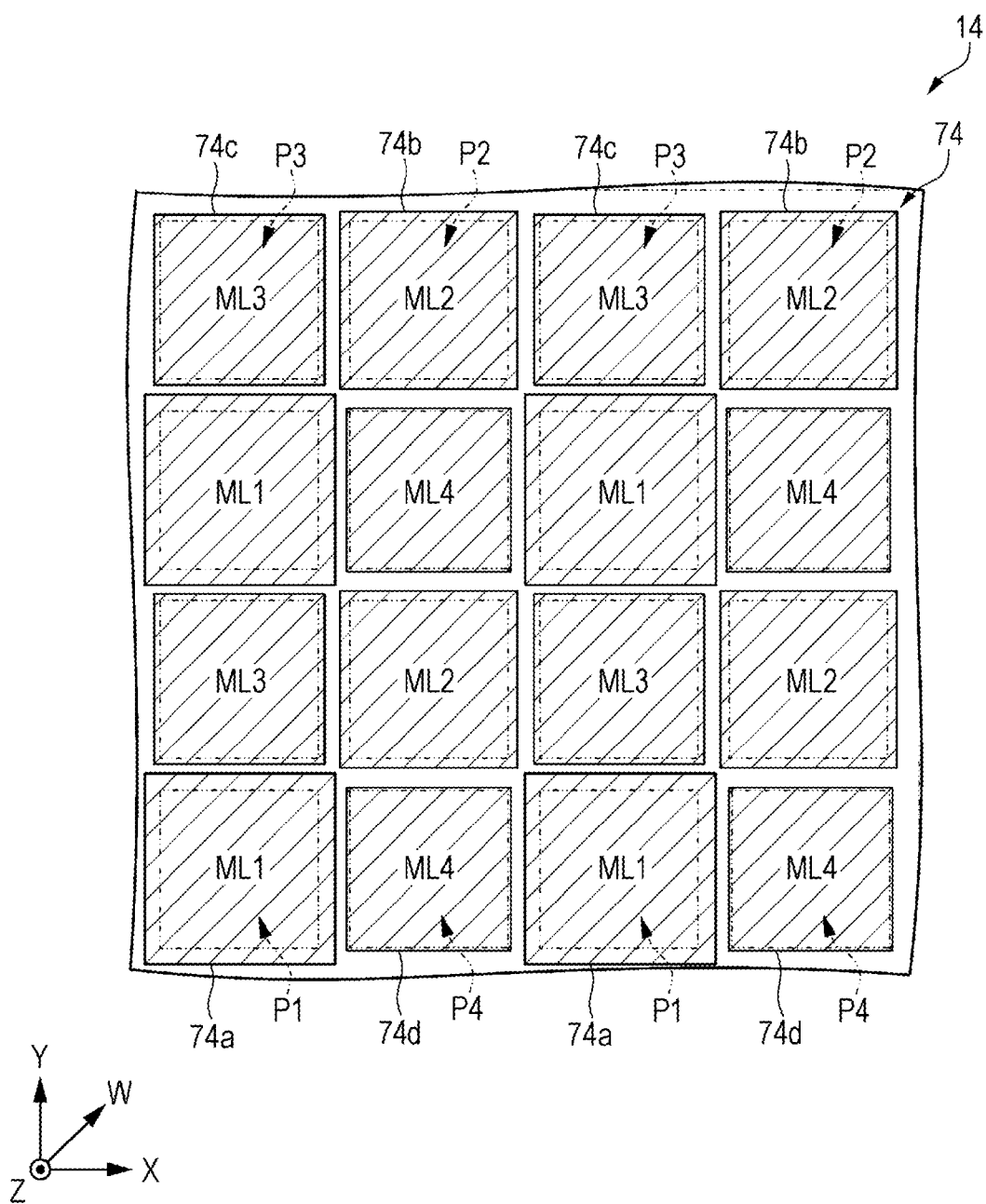
FIG. 11 is a schematic plan view showing the configuration of a resist portion in a patterning process of the micro lens array substrate according to the second embodiment.

First, as shown in FIG. 10A, a resist layer 74 is formed on the upper surface of the substrate 14 which is formed of SiOn or the like and has optical transparency. The resist layer 74 is formed of a positive photosensitive resist which is removed by developing exposed portions. It is possible to form the resist layer 74 using spin coating, roll coating or the like, for example.

Next, the resist layer 74 is patterned (the patterning process). More specifically, the resist layer 74 is exposed and developed via a mask 70, which includes four types of light shielding portion in which areas containing a light shielding portion 71a and a light shielding portion 71d are caused to differ alternately. The light shielding portions including the light shielding portions 71a and the light shielding portions 71d are provided corresponding to the positions at which each of the convex portions 15a, 15b, 15c, and 15d are formed. Within the resist layer 74, regions other than the regions that overlap the light shielding portions including the light shielding portions 71a and the light shielding portions 71d are exposed.

Figure 10B:
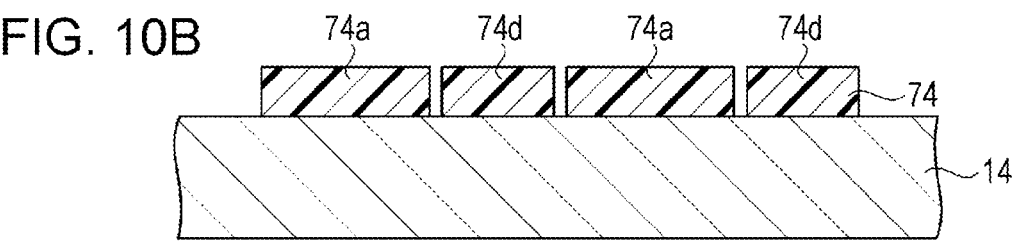

Next, as shown in FIG. 10B, the portion within the resist layer 74 that is exposed is developed and removed. Accordingly, within the resist layer 74, portions that overlap the light shielding portions including the light shielding portions 71a and the light shielding portions 71d are divided into islands and remain. As a result, the plurality of resist portions including resist portions 74a and resist portions 74d are formed. The resist portions 74a serve as the first resist portions which are portions that overlap the light shielding portions 71a, and the resist portions 74d serve as the second resist portions which are portions that overlap the light shielding portions 71d.

FIG. 11 is a plan view of the plurality of resist portions (the resist layer 74) which are formed on the substrate 14 as seen from above. In FIG. 11, the portions indicated using diagonal shading are the plurality of resist portions (the resist layer 74). The regions of the pixels P1, P2, P3, and P4 are indicated using two-dot chain lines. As shown in FIG. 11, the resist portions 74a are provided to correspond to the pixels P1. Similarly, resist portions 74b, 74c, and 74d are provided to correspond to the pixels P2, P3, and P4, respectively.

The resist portions 74a, 74b, 74c, and 74d have a substantially rectangular planar shape. The resist portions 74a, 74b, 74c, and 74d are disposed so as to be separated by the space between the resist portions that are adjacent to one another in all of the X direction, the Y direction and the W direction. The lengths of the diagonal lines of the resist portions 74a, 74b, 74c, and 74d are greater than the lengths of the diagonal lines of the regions of the pixels P1, P2, P3, and P4, and increase in magnitude in order of 74d<74c<74b<74a. Therefore, the resist portions 74a, 74b, 74c, and 74d have different areas from one another.

Of the resist portions 74a, 74b, 74c, and 74d, the resist portions 74a correspond to the micro lenses ML1 which are formed in a later process. Similarly, the resist portions 74b, 74c, and 74d correspond to the micro lenses ML2, ML3, and ML4, respectively.

Note that, the planar shape of the resist portions 74a, 74b, 74c, and 74d is not limited to a substantially rectangular shape, and may also be another shape, such as a substantially circular shape. For example, when the resist portions 74a, 74b, 74c, and 74d have substantially circular planar shapes, the micro lenses ML1, ML2, ML3, and ML4 which are formed in a later process also have substantially circular planar shapes. Note that, the planar shape of the resist portions 74a, 74b, 74c, and 74d can be set to the desired shape using the planar shape of the light shielding portions in the mask 70 which patterns the resist layer 74.

Figure 10C:
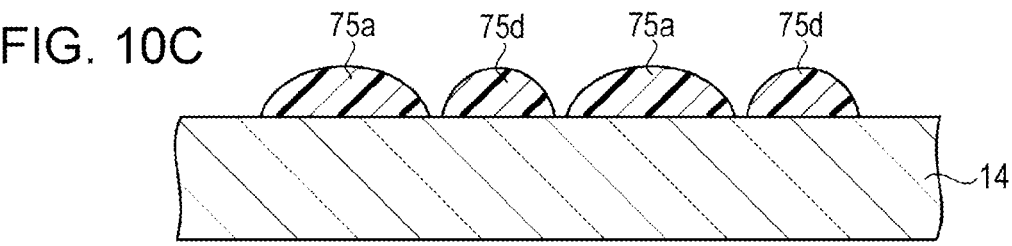

Next, the plurality of resist portions including the resist portions 74a and the resist portions 74d are softened (melted) by being subjected to a reflow process and being heated. Each of the melted resist portions enters a fluid state and the surfaces thereof deform into a curved shape due to the effect of surface tension. Accordingly, as shown in FIG. 10C, a plurality of convex portions including the substantially spherical or substantially elliptical convex portions 75a and convex portions 75d are formed from the plurality of resist portions including the resist portions 74a and the resist portions 74d which remain on the substrate 14.

Note that, the thickness (the height) of the plurality of convex portions including the convex portions 75a and 75d which are formed in a curved shape may be thicker than the thickness of the resist layer 74 which is formed in the process shown in FIG. 10A. When comparing the convex portion 75a and the convex portion 75d, since the volume of the resist portion 74a before heating is greater than the volume of the resist 74d, the convex portion 75a may be thicker than the convex portion 75d.

Note that, a method other than the reflow processing described above may be used as the method of forming the plurality of convex portions including the convex portions 75a and the convex portions 75d from the resist layer 74. For example, it is possible to form the plurality of convex portions from the resist layer 74 using a method in which a grayscale mask or an area graded mask is used and exposure is performed, a method of multi-level exposure, or the like.

Figure 10D:
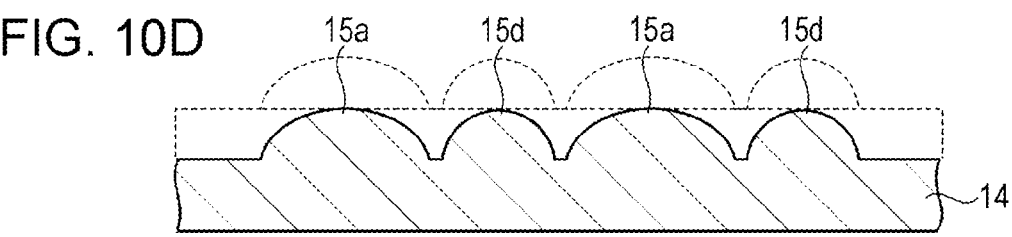

Next, as shown in FIG. 10D, the plurality of convex portions including the convex portions 75a and the convex portions 75d and the substrate 14 are subjected to anisotropic etching such as dry etching from above, for example. Accordingly, the plurality of convex portions including the convex portions 75a and the convex portions 75d formed of resist are gradually removed, and exposed portions of the substrate 14 are etched together with the removal of the plurality of convex portions. As a result, the shape of the plurality of convex portions including the convex portions 75a and the convex portion 75d is transferred to the substrate 14, and a plurality of convex portions including the convex portions 15a and the convex portions 15d are formed on the substrate 14.

Note that, in the anisotropic etching, by using conditions in which it is possible to etch the plurality of convex portions (the resist layer 74) including the convex portions 75a and the convex portions 75d and the substrate 14 at approximately the same rate, it is possible to render each of the convex portions that is formed from the resist layer 74 and each of the convex portions that is formed on the substrate 14 substantially the same shape.

Figure 10E:
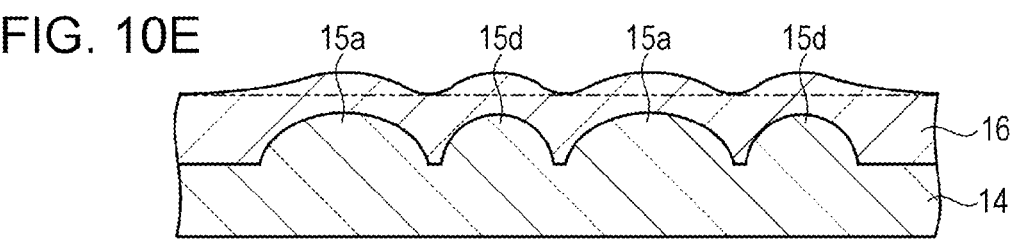

Next, as shown in FIG. 10E, the light transmitting layer 16, which and is formed of an inorganic material that has optical transparency and a lower refractive index than the material of the substrate 14, is formed to cover the substrate 14 on which the plurality of convex portions including the convex portions 15a and the convex portions 15d are formed. It is possible to form the light transmitting layer 16 using the CVD method, for example. Since the light transmitting layer 16 is formed to be deposited on the substrate 14, on which the plurality of convex portions including the convex portions 15a and the convex portions 15d are formed, the portion of the layer above the light transmitting layer 16 has an uneven shape, reflecting the unevenness caused by the plurality of convex portions.

Next, the light transmitting layer 16 shown in FIG. 10E is subjected to a planarization process such as the CMP process, and the upper surface of the light transmitting layer 16 is planarized by polishing and removing the portion of the layer above the light transmitting layer 16 in which the unevenness is formed (the portion above the two-dot chain line shown in FIG. 10E). As a result of subjecting the light transmitting layer 16 to the planarization process, as shown in FIG. 8, the upper surface of the light transmitting layer 16 is planarized and the micro lens array substrate 10A is completed.

In the following processes, the opposing substrate 30A is obtained by forming each layer on the micro lens array substrate 10A in the same manner as in the first embodiment. The element substrate 20 and the opposing substrate 30A are bonded to one another, and the liquid crystal device 1A is completed.

Also in the manufacturing method of the micro lens array substrate 10A according to the second embodiment, it is possible to form the micro lenses ML1, ML2, ML3, and ML4 in which the lens diameters differ alternately in the same process. In other words, the resist layer 74 is divided into four types of resist portion in which the lengths of the diagonal lines differ, the resist portions are heated, the convex portions are formed from each of the resist portions, and it is possible to form the micro lenses ML1, ML2, ML3, and ML4 by transferring the shape of the resist portions to the substrate 14. Accordingly, it is possible to provide the liquid crystal device 1A which can reduce the influence of the diffraction of light, and which includes the micro lens array substrate 10A that can be manufactured easily.

Third Embodiment

A liquid crystal device according to the third embodiment has a configuration that is substantially the same as that of the second embodiment except in that the micro lenses are formed of concave portions that are formed in the substrate in the same manner as in the first embodiment, and in that the micro lenses are disposed to be shifted. Here, description will be given mainly of the differences in the configuration and the manufacturing method of the micro lens array substrate in relation to the above embodiments.

Micro Lens Array Substrate

Figure 12A:
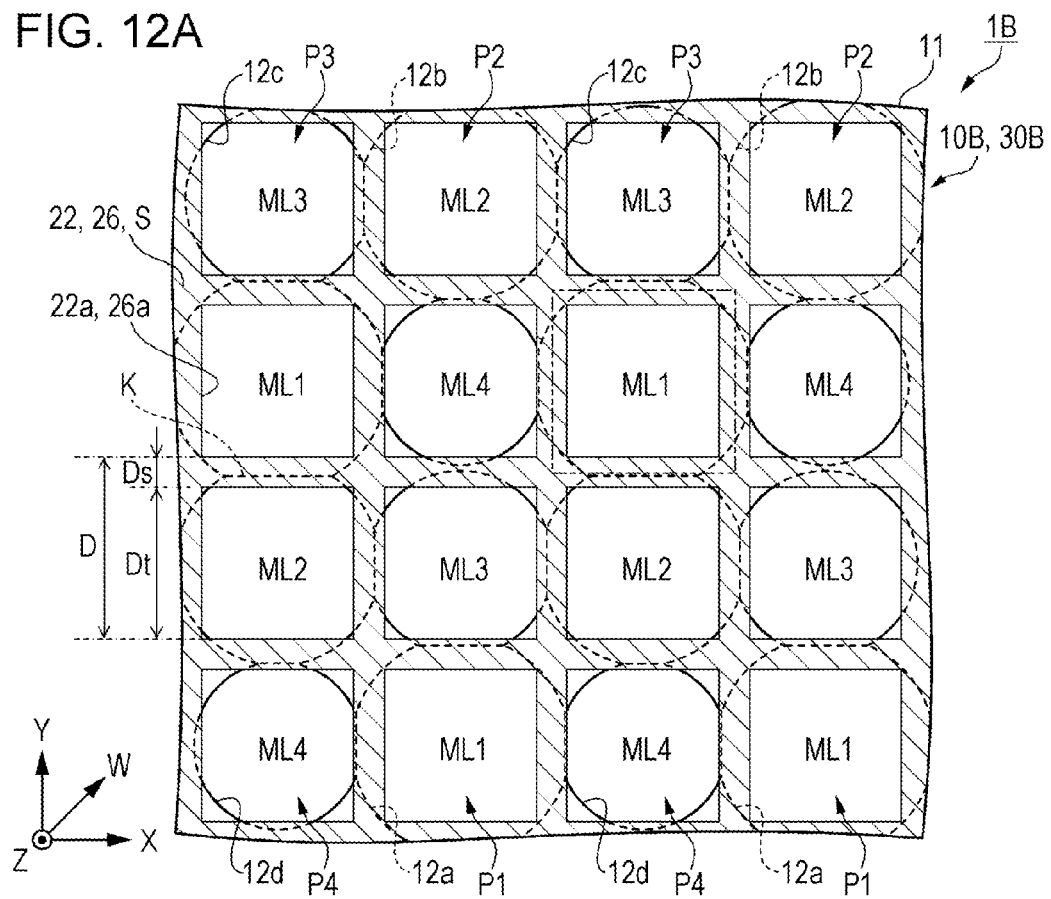
FIGS. 12A and 12B are schematic diagrams showing the configuration of a micro lens substrate according to a third embodiment.
Figure 12B:
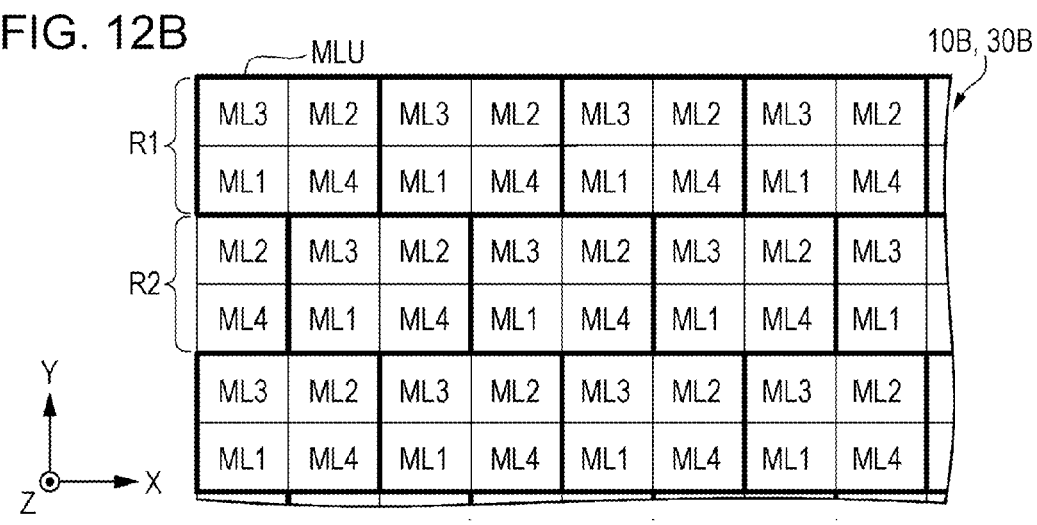

FIGS. 12A and 12B are schematic diagrams showing the configuration of a micro lens substrate according to the third embodiment. Specifically, FIG. 12A is a schematic plan view showing the configuration of the micro lens substrate according to the third embodiment, and FIG. 12B is a plan view showing the arrangement of the micro lenses in the micro lens substrate. Components that are shared with the above embodiments are given the same reference numerals and description thereof will be omitted.

As shown in FIG. 12A, in a liquid crystal device 1B according to the third embodiment, an opposing substrate 30B is provided with a micro lens array substrate 10B. In the same manner as the micro lens array substrate 10A according to the second embodiment, the micro lens array substrate 10B is provided with the micro lenses ML1, ML2, ML3, and ML4 to correspond to the pixels P1, P2, P3, and P4.

In the micro lens array substrate 10B, the concave portions 12a, 12b, 12c, and 12d are provided on the substrate 11 to correspond to the pixels P1, P2, P3, and P4. In the same manner as the micro lens array substrate 10 according to the first embodiment, the micro lenses ML1, ML2, ML3, and ML4 are formed by filling the concave portions 12a, 12b, 12c, and 12d with the material which forms the light transmitting layer 13 (refer to FIG. 3).

In the same manner as the first embodiment, the micro lenses ML1, ML2, ML3, and ML4 have a substantially circular planar shape. The lens diameters (the diameters) of the micro lenses ML1, ML2, ML3, and ML4 are all equal to or greater than the width Dt of the opening portions 32a, and increase in magnitude in the order of ML4<ML3<ML2<ML1.

The micro lenses ML1, ML2, ML3, and ML4 are provided such that micro lenses which are adjacent to one another in the X direction and the Y direction contact one another. The boundary K between the micro lenses that are adjacent to one another in the X direction and the Y direction is disposed in a region that overlaps the light shielding layers 22 and 26 (the light shielding region S) in plan view. The micro lenses ML1, ML2, ML3, and ML4 are separated by the space between the micro lenses that are adjacent to one another in the W direction.

As shown surrounded with bold lines in FIG. 12B, the MLUs are arranged repeatedly on the micro lens array substrate 10B, where the unit of each MLU is 2×2 micro lenses formed of the micro lenses ML1, ML2, ML3, and ML4 in which the lens diameters differ alternately. In the present embodiment, in relation to the second embodiment, the MLUs with 2×2 micro lens units are arranged to be shifted alternately in the X direction when comparing the row R1 and the row R2, which are adjacent.

The MLUs are arranged repeatedly on the micro lens array substrate 10A according to the present embodiment so as to be shifted along the X direction when comparing the row R1 and the row R2 which are adjacent, where the unit of each MLU is 2×2 micro lenses in which the lens diameters differ alternately; therefore, the repeating arrangement pattern of the micro lenses is provided for every eight pixels. Accordingly, in the liquid crystal device 1B according to the present embodiment, it is possible to further suppress the spread angle of the light caused by the interference of diffracted light arising from the micro lenses in comparison to in the above embodiments.

Manufacturing Method of Electro-Optical Device

Figure 13:
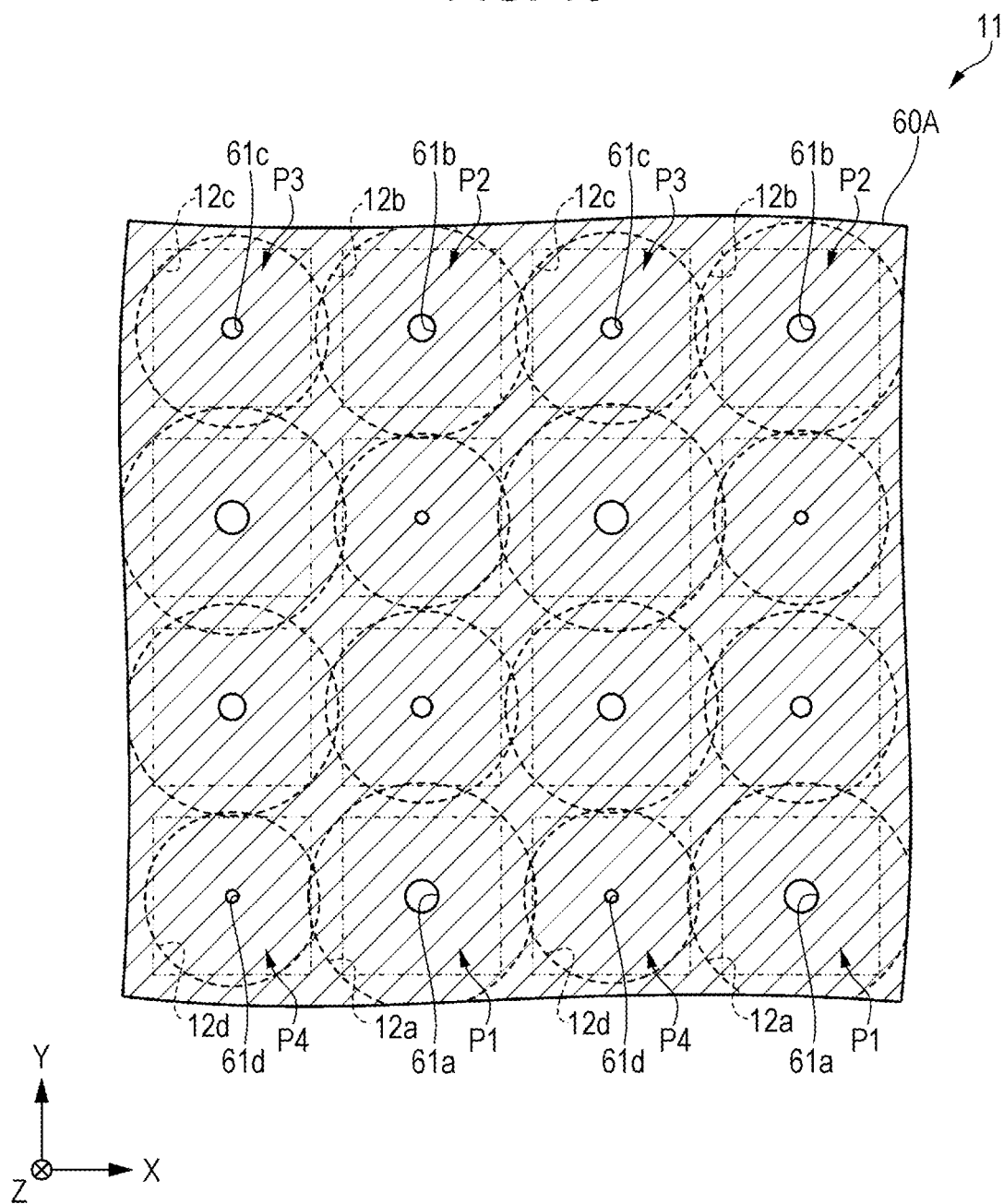
FIG. 13 is a schematic plan view showing the configuration of a mask layer used in the manufacture of a micro lens array substrate according to the third embodiment.

Next, description will be given of the manufacturing method of the liquid crystal device 1B according to the third embodiment. The manufacturing method of the liquid crystal device 1B (the micro lens array substrate 10B) according to the third embodiment is substantially the same as that of the first embodiment except in that the configuration of the mask layer, which is used when forming the concave portions in the substrate, is different. Here, description will be given of the configuration of a mask layer 60A according to the third embodiment. FIG. 13 is a schematic plan view showing the configuration of the mask layer used in the manufacture of the micro lens array substrate according to the third embodiment.

FIG. 13 is a plan view of the mask layer 60A which is formed on the substrate 11 as seen from above the surface of the mask layer 60A. In FIG. 13, the regions of the pixels P1, P2, P3, and P4 are indicated with two-dot chain lines, and the positions in which the concave portions 12a, 12b, 12c, and 12d are formed in later processes are indicated with broken lines.

In the mask layer 60A indicated using diagonal shading in FIG. 13, the opening portions 61a, 61b, 61c, and 61d are provided to correspond to the positions in which the concave portions 12a, 12b, 12c, and 12d are formed, respectively. The opening portions 61a, 61b, 61c, and 61d are disposed in positions which form the planar centers of the pixels P1, P2, P3, and P4, respectively. The opening portions 61a, 61b, 61c, and 61d have a substantially circular planar shape.

The opening diameters of the opening portions 61a, 61b, 61c, and 61d increase in magnitude in order of 61d<61c<61b<61a. The opening diameters of the opening portions 61a, 61b, 61c, and 61d can be set to approximately 1.4 μm, approximately 1.2 μm, approximately 1.0 μm, approximately 0.8 μm, in order, for example. By subjecting the substrate 11 to isotropic etching via the mask layer 60A which includes the opening portions 61a, 61b, 61c, and 61d, it is possible to form the concave portions 12a, 12b, 12c, and 12d, in which the diameters are alternately different, in the same process. Accordingly, it is possible to provide the liquid crystal device 1B which can reduce the influence of the diffraction of light, and which includes the micro lens array substrate 10B that can be manufactured easily.

Note that, in the third embodiment, a configuration may be adopted in which the micro lenses ML1, ML2, ML3, and ML4 are formed of the convex portions 15a, 15b, 15c, and 15d which are formed on the substrate 14 in the same manner as in the micro lens array substrate 10A according to the second embodiment, and 2×2 micro lenses (MLUs) are arranged repeatedly such that adjacent rows are alternately shifted in the X direction. It is possible to obtain the same effect even with this configuration.

Fourth Embodiment

Figure 14:
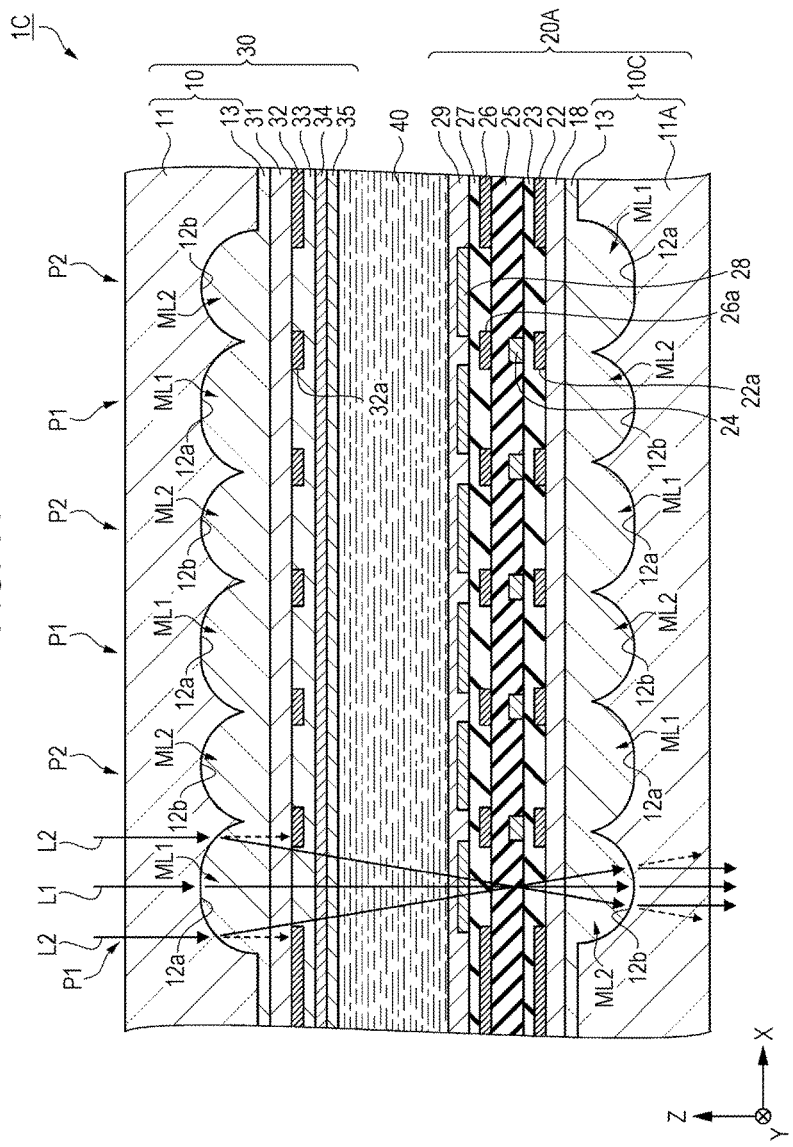
FIG. 14 is a schematic cross-sectional diagram showing a configuration of a liquid crystal device according to a fourth embodiment.

A liquid crystal device according to the fourth embodiment has a configuration that is substantially the same as that of the first embodiment except in that the element substrate is also provided with a micro lens array substrate. FIG. 14 is a schematic cross-sectional diagram showing the configuration of the liquid crystal device according to the fourth embodiment. FIGS. 15A and 15B are schematic plan views showing the configuration of the micro lens substrate according to the fourth embodiment. Specifically, FIG. 15A is a plan view showing the arrangement of the micro lenses in the micro lens array substrate 10 which the opposing substrate 30 is provided with. Specifically, FIG. 15B is a plan view showing the arrangement of the micro lenses in the micro lens array substrate 10 which an element substrate 20A is provided with. Components that are shared with the first embodiment are given the same reference numerals and description thereof will be omitted.

Electro-Optical Device

As shown in FIG. 14, a liquid crystal device 1C according to the fourth embodiment is provided with the element substrate 20A, the opposing substrate 30, and the liquid crystal layer 40. The element substrate 20A according to the fourth embodiment is provided with a micro lens array substrate 10C. In other words, the liquid crystal device 1C is provided with micro lens array substrates on both the side on which light is incident and the side from which light is emitted.

The element substrate 20A is provided with the micro lens array substrate 10C, an optical path length adjustment layer 18, the light shielding layer 22, the insulating layer 23, the TFTs 24, the insulating layer 25, the light shielding layer 26, the insulating layer 27, the pixel electrodes 28, and the orientation film 29. The micro lens array substrate 10C includes a substrate 11A, which is provided with the concave portions 12a and the concave portions 12b, and the light transmitting layer 13, and includes the micro lenses ML1 and the micro lenses ML2 which are configured by the aforementioned. The optical path length adjustment layer 18 has the same configuration and role as the optical path length adjustment layer 31 of the micro lens array substrate 10.

In the substrate 11A, the concave portions 12b are disposed corresponding to the pixels P1, and the concave portions 12a are disposed corresponding to the pixels P2. Therefore, in the micro lens array substrate 10C, the array of the micro lenses ML1 and ML2 differs from in the micro lens array substrate 10. In other words, in the opposing substrate 30 (the micro lens array substrate 10) and the element substrate 20A (the micro lens array substrate 10C), the micro lenses ML1 and the micro lenses ML2 are disposed to oppose one another.

In the opposing substrate 30 according to the fourth embodiment, the light shielding layer 32 is provided in the display region E as a lattice so as to overlap the light shielding layers 22 and 26 of the element substrate 20A in plan view. Regions that are surrounded by the light shielding layer 32 (within the opening portion 32a), and regions that are surrounded by the light shielding layers 22 and 26 (within the opening portions 22a and 26a) overlap in plan view and are regions that transmit light.

In the liquid crystal device 1C according to the fourth embodiment, of the light which is emitted from a light source or the like, the incident light L2 which is incident on the peripheral edge portion of the micro lens ML1 in the pixel P1 is refracted toward the planar center of the pixel P1 due to the condensing effect of the micro lens ML1, and enters the opening portion 32a of the light shielding layer 32 without being blocked by the light shielding layer 32. After passing through the liquid crystal layer 40 and the focal point of the micro lens ML1, the incident light L2 spreads radially and is incident on the micro lens ML2 of the element substrate 20A (the micro lens array substrate 10C).

If the incident light L2 which spreads radially and is incident on the micro lens ML2 hypothetically proceeds directly as-is, the incident light L2 spreads further radially as indicated with the broken lines; however, the incident light L2 is refracted again toward the planar center of the pixel P1 by the micro lens ML2. Accordingly, it is possible to suppress the spreading of the incident light L2 and cause the incident light L2 to be emitted from the element substrate 20A. In this manner, in the liquid crystal device 1C, it is possible to suppress the spreading of emitted light in addition to increasing the efficiency for light utilization by condensing the incident light which would be blocked by the light shielding layer 32 and causing the incident light to be transmitted.

As shown surrounded with bold lines in FIG. 15A, the MLUs are arranged repeatedly on the micro lens array substrate 10, where the unit of each MLU is formed of a set of the micro lens ML1 and the micro lens ML2, so as to be shifted alternately when comparing the row R1 and the row R2, which are adjacent, in the same manner as the first embodiment.

Meanwhile, as shown surrounded in FIG. 15B, the MLUs are arranged repeatedly on the micro lens array substrate 10C, where the unit of each MLU is formed of a set of the micro lens ML1 and the micro lens ML2, so as to be shifted alternately when comparing the row R1 and the row R2, which are adjacent. Accordingly, in the liquid crystal device 1C, in the configuration in which two micro lens array substrates are provided, it is possible to further suppress the spread angle of the light caused by the interference of diffracted light arising from the micro lenses.

When comparing the micro lens array substrate 10 and the micro lens array substrate 10C, the MLUs with a set of the micro lens ML1 and the micro lens ML2 as the unit are disposed to be shifted alternately along the X direction in both the row R1 and the row R2. Therefore, in comparison to a case in which the MLUs are not shifted when comparing the micro lens array substrate 10 and the micro lens array substrate 10C, it is possible to further suppress the spread angle of the light caused by the interference of diffracted light arising from the micro lenses.

Note that, in the fourth embodiment, a configuration may be adopted in which both the opposing substrate 30 and the element substrate 20A are provided with the micro lens array substrate 10A according to the second embodiment, or a configuration may be adopted in which both the opposing substrate 30 and the element substrate 20A are provided with the micro lens array substrate 10B according to the third embodiment. Alternatively, a configuration may be adopted in which the micro lens array substrates with different combinations are provided on the opposing substrate 30 and the element substrate 20A.

Fifth Embodiment

Electronic Apparatus

Figure 16:
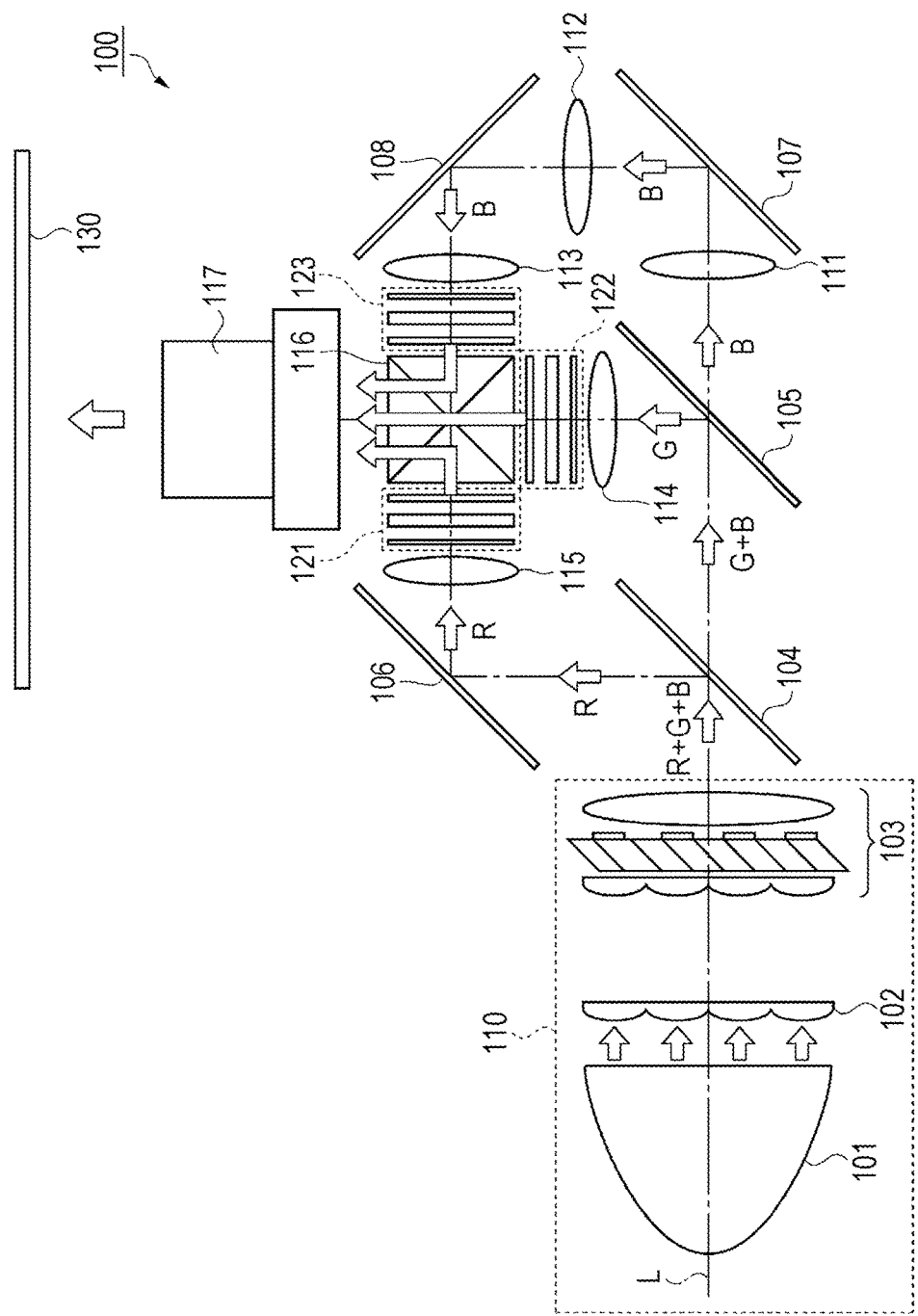
FIG. 16 is a schematic diagram showing the configuration of a projector as an electronic apparatus according to a fifth embodiment.

Next, description will be given of an electronic apparatus according to the fifth embodiment with reference to FIG. 16. FIG. 16 is a schematic diagram showing the configuration of a projector as the electronic apparatus according to the fifth embodiment.

As shown in FIG. 16, a projector (a projection-type display device) 100 as the electronic apparatus according to the fifth embodiment is provided with a polarizing illumination device 110, two dichroic mirrors 104 and 105, three reflecting mirrors 106, 107 and 108, five relay lenses 111, 112, 113, 114, and 115, three liquid crystal light bulbs 121, 122, and 123, a cross dichroic prism 116, and a projection lens 117.

The polarizing illumination device 110 is provided with a lamp unit 101 as the light source that is formed of a white light source such as an ultrahigh pressure mercury lamp or a halogen lamp, for example, an integrator lens 102, and a polarization conversion element 103. The lamp unit 101, the integrator lens 102, and the polarization conversion element 103 are disposed along a system optical axis L.

Of the polarized luminous flux emitted from the polarizing illumination device 110, the dichroic mirror 104 reflects the red light (R) and transmits the green light (G) and the blue light (B). The other dichroic mirror 105 reflects the green light (G) which is transmitted by the dichroic mirror 104, and transmits the blue light (B).

The red light (R) which is reflected by the dichroic mirror 104 is reflected by the reflecting mirror 106, and is subsequently incident to the liquid crystal light bulb 121 through the relay lens 115. The green light (G) which is reflected by the dichroic mirror 105 is incident to the liquid crystal light bulb 122 through the relay lens 114. The blue light (B) which is transmitted by the dichroic mirror 105 is incident to the liquid crystal light bulb 123 through a light guide system configured of the three relay lenses 111, 112, and 113, and the two reflecting mirrors 107 and 108.

The transparent liquid crystal light bulbs 121, 122, and 123, which are light modulating elements, are disposed to face the each entrance surface for the respective colors of light of the cross dichroic prism 116. The colored light which is incident on the liquid crystal light bulbs 121, 122, and 123 is modulated on the basis of image information (an image signal) and is emitted toward the cross dichroic prism 116.

The cross dichroic prism 116 is configured by bonding four right-angle prisms together, and on the inner surface thereof, a dielectric multilayer film which reflects red light and a dielectric multilayer film which reflects blue light are formed in a cross shape. The three colors of light are combined by the dielectric multilayer films to form the light representing the color image. The combined light is projected onto a screen 130 by the projection lens 117, which is the projection optical system, and the image is enlarged and displayed.

One of the liquid crystal devices 1, 1A, 1B, or 1C of each of the embodiments described above is applied to the liquid crystal light bulb 121. The liquid crystal light bulb 121 is disposed between a pair of polarizing elements to leave gaps therebetween, and the polarizing elements are disposed in a crossed Nicol configuration at the incidence and the emission sides of the colored light. The same applied to the other liquid crystal light bulbs 122 and 123.

According to the configuration of the projector 100 according to the fifth embodiment, even if the plurality of pixels P is disposed in high resolution, the liquid crystal devices 1, 1A, 1B, and 1C that are capable of efficiently using the incident colored light and in which the spread angle of the light caused by the interference of diffracted light arising from the micro lenses is further suppressed are provided; therefore, it is possible to provide the high-quality and bright projector 100.

The embodiments described above merely describe a mode of the invention, and may be modified and put to practical use arbitrarily within the scope of the invention. Modification examples such as those described hereinafter may be considered.

Modification Example 1

The liquid crystal device 1, 1A, 1B, or 1C according to the above embodiments adopts a configuration in which the MLUs are arranged repeatedly on the micro lens array substrate 10, 10A, 10B, or 10C, where the unit of each MLU is 1×2 or 2×2 micro lenses in which the lens diameters differ alternately; however, the invention is not limited thereto. For example, as shown surrounded with thick lines in FIG. 17A, a configuration may be adopted in which MLUs with 3×3 micro lens units are arranged repeatedly.

By using 3×3 micro lens units, even when the MLUs are arranged without being shifted when comparing the row R1, the row R2, and the row R3, it is possible to provide the repeating arrangement pattern of the micro lenses for every nine pixels. In this manner, it is possible to further suppress the spread angle of the light caused by the interference of diffracted light arising from the micro lenses by increasing the numbers m and n of the m×n micro lenses that configure the repeating arrangement pattern. As shown in FIG. 17A, it is possible to provide the repeating arrangement pattern of the micro lenses for every 27 pixels by adopting a configuration in which MLUs with 3×3 micro lens units are arranged to be shifted alternately when comparing the row R1, the row R2, and the row R3.

Modification Example 2

The liquid crystal device 1, 1A, 1B, or 1C according to the above embodiments adopts a configuration in which the MLUs are arranged repeatedly on the micro lens array substrate 10, 10A, 10B, or 10C, where the unit of each MLU is m×n micro lenses in which the lens diameters differ alternately; however, the invention is not limited thereto. For example, a configuration may be adopted in which a plurality of MLUs with different repeating arrangement patterns are combined. FIG. 17B shows an example in which an MLU1 with 3×3 micro lens units and an MLU2 with 2×2 micro lens units are combined.

In the example shown in FIG. 17B, the MLU1 in which the repeating arrangement pattern of the micro lenses is provided for every nine pixels is disposed in the peripheral edge portion of the display region E, and the MLU2 in which this is for every four pixels is disposed on the inside thereof. The diffraction of the light arising from the micro lenses is known to occur more easily in the peripheral edge portion than the central portion. Therefore, it is possible to effectively suppress the interference of diffracted light arising from the micro lenses by disposing the ML1, which has a greater repetition period in comparison to the MLU2 which is disposed in the central portion, in the peripheral edge portion.

Modification Example 3

The liquid crystal device 1, 1A, 1B, or 1C according to the above embodiments adopts a configuration in which the MLUs are arranged in an orderly manner on the micro lens array substrate 10, 10A, 10B, or 10C, where the unit of each MLU is m×n micro lenses in which the lens diameters differ alternately; however, the invention is not limited thereto. For example, a configuration may be adopted in which the plurality of micro lenses with different lens diameters is arranged in a disorderly manner. It is possible to further suppress the spread angle of the light caused by the interference of diffracted light arising from the micro lenses, even when adopting such a configuration.

Modification Example 4

The electronic apparatus to which the liquid crystal devices 1, 1A, 1B, and 1C according to the above embodiments can be applied is not limited to the projector 100. It is possible to favorably use the liquid crystal devices 1, 1A, 1B, and 1C as a projection-type Head-Up Display (HUD), a direct viewing-type Head Mounted Display (HMD), an electronic book, a personal computer, a digital still camera, a liquid crystal television, a view-finder type or monitor direct viewing type of video recorder, a car navigation system, an electronic organizer, or a display unit of an information terminal apparatus such as a POS, for example.

The entire disclosure of Japanese Patent Application No. 2013-163944, filed Aug. 7, 2013 is expressly incorporated by reference herein.

What is claimed is:

1. An electro-optical device comprising:
a first substrate;
a second substrate which is disposed to oppose the first substrate;

an electro-optical layer which is disposed between the first substrate and the second substrate; and a light shielding portion which is disposed above at least one of the first substrate and the second substrate, wherein the first substrate includes a first lens and a second lens, the first lens is adjacent to the second lens, a diameter of the first lens is different from a diameter of the second lens, and a boundary between the first lens and the second lens is disposed in a region which overlaps the light shielding portion in plan view.

2. The electro-optical device according to claim 1, wherein the first substrate includes a plurality of lenses including the first lens and the second lens, and the plurality of lenses are arranged at a predetermined pitch in a first direction and a second direction which intersects the first direction.

3. The electro-optical device according to claim 2, wherein the plurality of lenses are arranged repeatedly in a plurality of unit lenses, and each unit lens is m (where m is a natural number of 1 or greater)×n (where n is a natural number of 2 or greater) lenses with alternately different lens diameters and includes the first lens and the second lens.

4. The electro-optical device according to claim 3, further comprising:

a first row in which the plurality of unit lenses are arranged repeatedly along the first direction; and a second row, which is adjacent to the first row, in which the plurality of unit lenses are arranged repeatedly along the first direction, wherein the unit lenses which are arranged in the first row and the unit lenses which are arranged in the second row are disposed to be shifted alternately in the first direction.

5. The electro-optical device according to claim 3, wherein both the first substrate and the second substrate include the plurality of lenses, and the plurality of unit lenses of the first substrate and the plurality of unit lenses of the second substrate are disposed to be shifted alternately in at least one of the first direction and the second direction in plan view.

6. An electronic apparatus, comprising:

eletro-optical device according to claim 1.

7. The electro-optical device according to claim 1, wherein the first lens is adjacent to the second lens in a first direction, the first direction extending along a side of the first substrate or the second substrate.

8. The electro-optical device according to claim 1, further comprising:

a plurality of lenses including the first lens and the second lens, and a plurality of pixels partitioned by the light shielding portion, wherein each lens included in the plurality of lenses is arranged to correspond to a pixel included in the plurality of pixels.

9. The electro-optical device according to claim 8, wherein:

the plurality of pixels includes a first pixel and a second pixel, the first pixel is adjacent to the second pixel, the first lens is arranged to correspond to the first pixel, and the second lens is arranged to correspond to the second pixel.

10. The electro-optical device according to claim 1, wherein a diameter of the first lens and a diameter of the second lens are equal to or greater than a width of an opening portion partitioned by the light shielding portion.

11. The electro-optical device according to claim 1, wherein a depth of the first lens and a depth of the second lens are approximately equal.

12. The electro-optical device according to claim 1, wherein the second substrate includes a third lens and a fourth lens, the diameter of the first lens is equal to a diameter of the third lens, the diameter of the second lens is equal to a diameter of the fourth lens, the first lens opposes the third lens, and the second lens opposes the fourth lens.

* * * * *